(12) United States Patent
Hirano et al.

(10) Patent No.: US 8,862,066 B2
(45) Date of Patent: Oct. 14, 2014

(54) PROVIDING SUPPRESSING DEGRADATION OF THROUGHPUT OF COMMUNICATION DEVICE, RECORDING MEDIUM FOR CONTROL PROGRAM OF COMMUNICATION DEVICE, COMMUNICATION SYSTEM AND COMMUNICATION METHOD

(75) Inventors: Yumi Hirano, Tokyo (JP); Satoru Yamano, Tokyo (JP)

(73) Assignee: NEC Corporation, Tokyo (JP)

( * ) Notice: Subject to any disclaimer, the term of this patent is extended or adjusted under 35 U.S.C. 154(b) by 388 days.

(21) Appl. No.: 13/256,696

(22) PCT Filed: Mar. 15, 2010

(86) PCT No.: PCT/JP2010/054757
§ 371 (c)(1),
(2), (4) Date: Sep. 15, 2011

(87) PCT Pub. No.: WO2010/110191
PCT Pub. Date: Sep. 30, 2010

(65) Prior Publication Data
US 2012/0003940 A1 Jan. 5, 2012

(30) Foreign Application Priority Data
Mar. 25, 2009 (JP) ................................ 2009-073644

(51) Int. Cl.
*H04B 17/00* (2006.01)
*H04W 74/08* (2009.01)
*H04W 84/12* (2009.01)

(52) U.S. Cl.
CPC .......... *H04W 74/0816* (2013.01); *H04W 84/12* (2013.01)
USPC ........................... 455/67.11; 455/9; 455/67.13

(58) Field of Classification Search
CPC ........ H04B 7/2606; H04B 7/155; H04B 1/60; H04B 7/18513; H04B 7/195; H04B 7/18521; H04B 7/18539; H04W 88/04; H04W 84/047; H04W 16/26; H04W 84/08
USPC ......... 370/232, 203, 315, 338, 349, 351, 389, 370/252, 445; 455/7, 11.1, 13.1, 67.13, 9, 455/67.11
See application file for complete search history.

(56) References Cited

U.S. PATENT DOCUMENTS

| 2003/0189948 A1* | 10/2003 | Sashihara | 370/445 |
| 2007/0015461 A1* | 1/2007 | Park et al. | 455/13.1 |
| 2008/0037457 A1* | 2/2008 | Matsukura et al. | 370/315 |

(Continued)

FOREIGN PATENT DOCUMENTS

| JP | 2006-165758 A | 6/2006 |
| JP | 2007-266876 A | 10/2007 |

(Continued)

OTHER PUBLICATIONS

International Search Report for PCT/JP2010/054757 mailed May 25, 2010.
Japanese Office Action for JP Application No. 2011-506019 mailed on Jan. 28, 2014 with English Translation.

*Primary Examiner* — Golam Sorowar
(74) *Attorney, Agent, or Firm* — Sughrue Mion, PLLC

(57) ABSTRACT

In order to settle a problem of suppressing degradation of a throughput of a communication system, a communication device is provided with a reception means which receives and accumulates a first datum which a first device transmits addressing a second device and a second datum which the second device transmits, a transmission means which transmits the first datum to the second device, a quality index acquisition means which acquires a first index which is a quality of communication between the first device and the second device and a second index which is a quality of communication between the communication device and the second device, and a judgment means which forces to transmit the accumulated first datum to the second device using the transmission means in the case of judging that the second index is better than the first index and a reception condition of the second datum shows that the second device does not receive normally the first datum.

19 Claims, 16 Drawing Sheets

(56) References Cited

U.S. PATENT DOCUMENTS

2008/0049718 A1* 2/2008 Chindapol et al. ............ 370/351
2009/0017752 A1* 1/2009 Lee .................................. 455/9
2009/0047898 A1* 2/2009 Imamura et al. ................. 455/7
2009/0061920 A1* 3/2009 Horiuchi et al. .............. 455/522

FOREIGN PATENT DOCUMENTS

| JP | 2008053794 A | 3/2008 |
| JP | 2008-131649 A | 6/2008 |
| JP | 2008227642 A | 9/2008 |

* cited by examiner

Fig.5

| TARGET NODE ID | SNR | MEASURING TIME |
|---|---|---|
| 0 | 20dB | 2009. 03. 10　21:00:05 |
| 1 | TRANSMISSION FAILED | 2009. 03. 08　11:00:30 |
| 2 | 12dB | 2009. 03. 05　07:45:00 |

Fig.12

| Octets: | 2 | 2 | 6 | 6 | 6 | 2 | 6 | 2 | 2 | 0–23424 | 4 |
|---|---|---|---|---|---|---|---|---|---|---|---|
| | Frame Control | Duration/ Id | Address 1 | Address 2 | Address 3 | Sequence Control | Address 4 | QoS Control | POSITION INFORMATION | Frame Body | FCS |

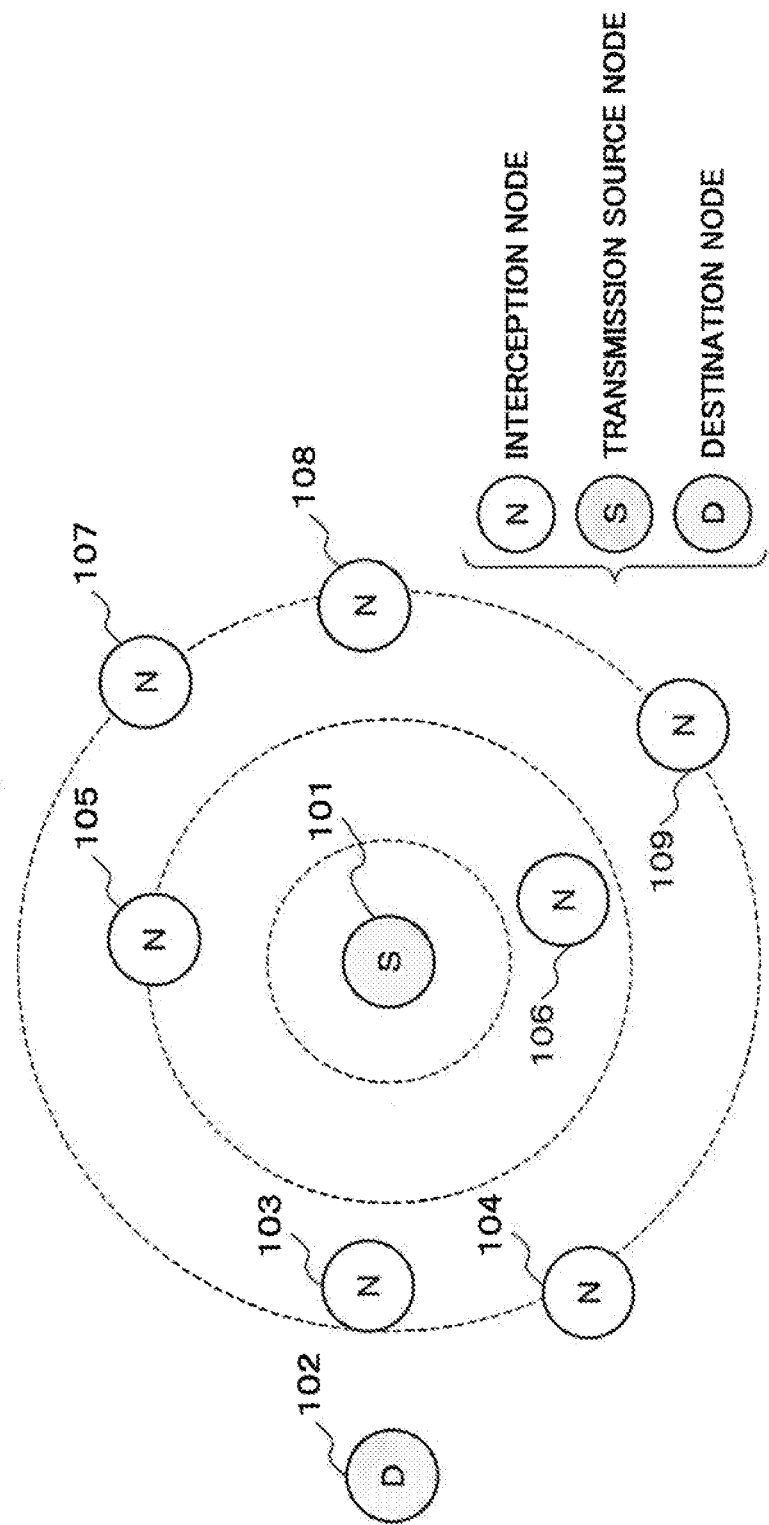

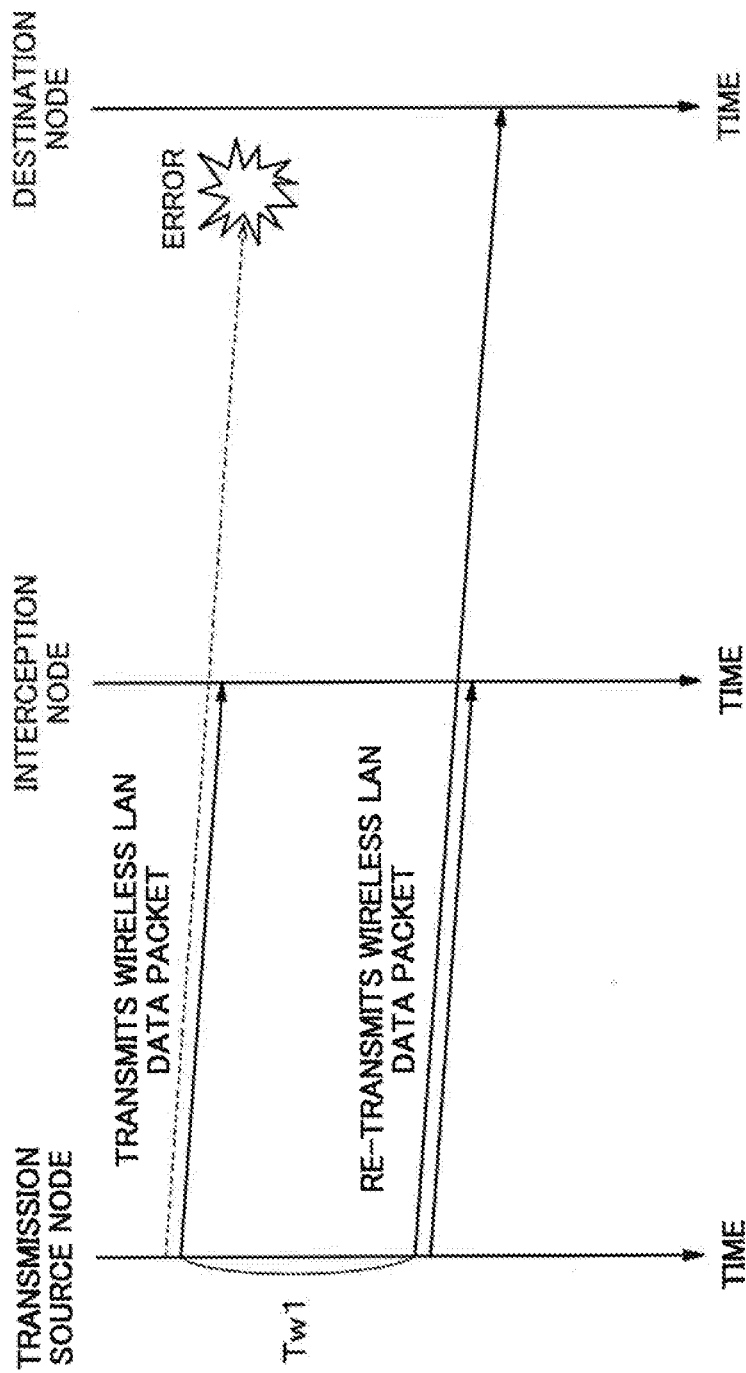

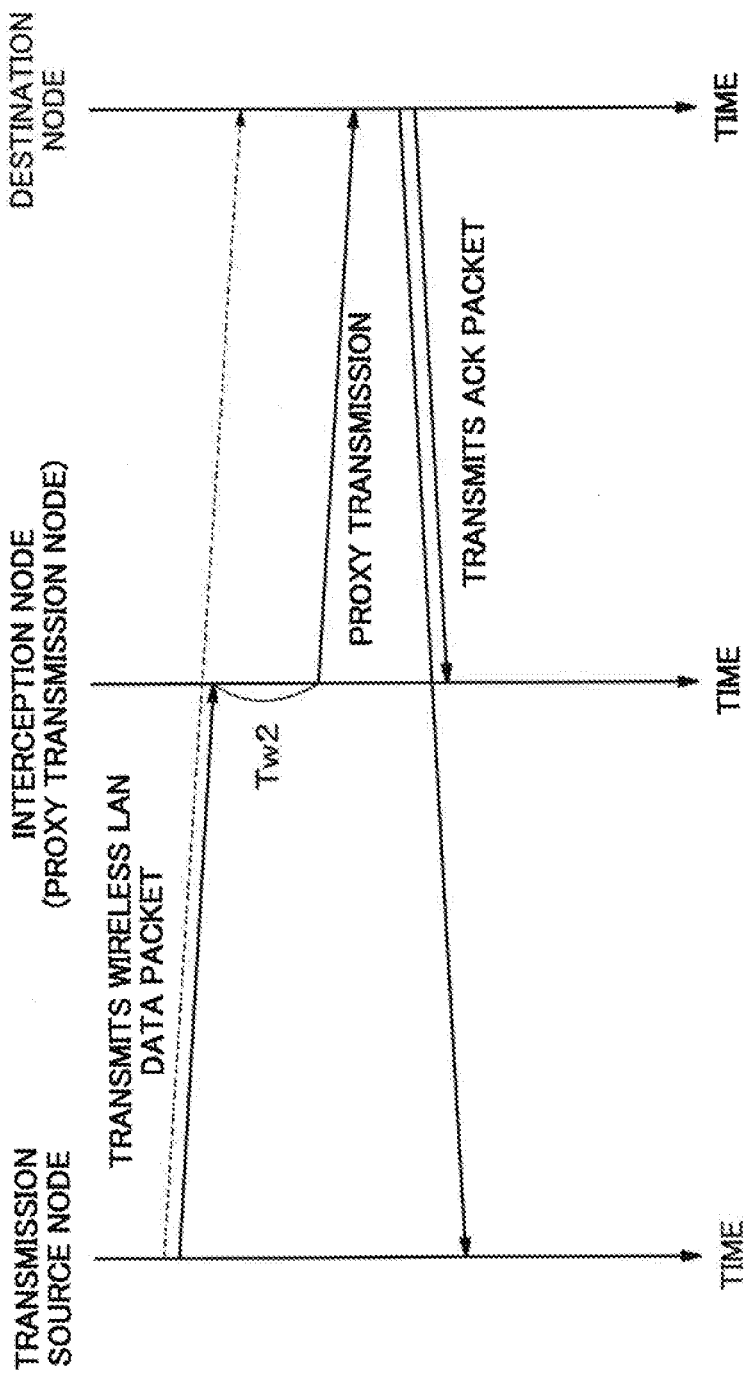

PROVIDING SUPPRESSING DEGRADATION OF THROUGHPUT OF COMMUNICATION DEVICE, RECORDING MEDIUM FOR CONTROL PROGRAM OF COMMUNICATION DEVICE, COMMUNICATION SYSTEM AND COMMUNICATION METHOD

TECHNICAL FIELD

The present invention relates to a communication device, a recording medium for a control program of the communication device, a communication system and a communication method.

BACKGROUND ART

Since IEEE (The Institute of Electrical and Electronics Engineers, Inc.) specified 802.11 standards in 1999, wireless LAN (Local Area Network) system is widely adapted in various applications.

In the wireless LAN system, due to retransmission of packets caused by packet losses, a problem that a throughput of the entire communication system may degrade occurs.

For example, in the case that the distance between a transmission source node and a destination node is far or a radio wave condition is unstable, packets losses may occur due to failure of a reception of the packets at the destination node. At the destination node, in the case that a reception condition of the datum from the transmission source node is poor, even if the transmission source node retransmits a packet, a possibility that the destination node repeats the failure in receiving the packet is high. As the result, in this case, the throughput of a radio communication system may degrade remarkably.

As a technology of settling the stated problem in a radio communication, a technology that selects an interception node in neighborhood of the destination node with a good communication condition between the destination node as a proxy transmission node of the destination node, and that the proxy transmission node retransmits the packet to the destination node instead of from the transmission source node is proposed.

Hereinafter, in the specification, "transmission source node" denotes a node which is an originating transmission source of transmission datum, "destination node" denotes a node which is a destination of the datum, and "interception node" denotes a node which can intercept the datum which are transmitted from the transmission source node to the destination node, respectively. In general, the interception node is located in the neighborhood of both the transmission source node and the destination node.

Patent document 1 describes a technology of retransmission packets using proxy transmission nodes. The patent document 1 discloses a configuration of the radio communication system wherein an interception node intercepts a communication between a transmission source node and a destination node, and in the case that the interception node cannot receive ACK (ACKnowledgement) message from the destination node, then the interception node retransmits a datum to the destination node.

Patent document 2 discloses a path control system that a transmission source node compares a quality of communication between the transmission source node and a destination node and a quality of communication between the destination node and a proxy transmission node, and selects a highest-quality path.

In addition, non-patent document 1 discloses a configuration of a wireless packet network that determines AIFS (Arbitration Inter Frame Space) and CWmin (Contention Window minimum) which are parameters in CSMA/CA (Carrier Sense Multiple Access/Collision Avoidance) method, according to quality of communication between a relay node and a destination node, and selects an interception node having a higher quality of communication as a proxy transmission node with a high probability.

The operation of the interception node involved in the proxy transmission will be described referring to FIGS. 14 to 16. FIG. 14 is a configuration diagram of the wireless LAN system in which the interception nodes are located. FIG. 15 is a figure showing a normal retransmission operation of the wireless LAN system that the interception node does not retransmit. FIG. 16 is a figure showing a retransmission operation where the interception node retransmits as the proxy transmission node.

In the wireless LAN system shown in FIG. 14, a transmission source node 101 transmits a packet to a destination node 102. Cases are described in the following where the proxy transmission is and is not executed by the interception node in the wireless LAN system shown in FIG. 14.

FIG. 15 shows a normal retransmission operation of the wireless LAN system wherein the interception node does not execute the proxy transmission.

After transmitting a first transmission packet to the destination node 102, the transmission source node 101 waits for a reply using an ACK packet which indicates a reception confirmation from the destination node 102. However, in the case that the packet can not reach the destination node 102 correctly because of any reasons on the way, the destination node 102 does not transmit the ACK packet to the transmission source node. In the case that the transmission source node 101 does not receive the reply in the ACK packet from the destination node 102 until the fixed waiting time (Tw1) has passed after the transmission of the packet, the transmission source node 101 retransmits the transmission packet to the destination node 102.

FIG. 16 is a sequence chart showing the retransmission operation in the case that the interception node executes the proxy transmission as the proxy transmission node. A case where a packet error occurred at the destination node 102 because the distance from the transmission source node 101 to the destination node 102 is far or the radio wave condition is unstable, even though interception nodes 103 to 109 correctly received the transmission packet from the transmission source node 101 is considered. In the case that the reception condition at the destination node is poor, even if the transmission source node 101 retransmits the transmission packet to the destination node, the possibility that the packet error occurs again at the destination node is high.

Therefore, the interception nodes wait for a reception of the ACK packet from the destination node during a certain waiting time (Tw2), after correctly received the transmission packet from the transmission source node 101. The interception nodes which could not receive the ACK packet until the waiting time Tw2 have passed participate in a procedure for the transmission right acquisition in a random access principle. This procedure is called a backoff procedure. As the result of executing the backoff procedure, an interception node which acquired the transmission right retransmits the datum to the destination node as the proxy transmission node. In this case, it is also assumed that interception nodes do not exist in the neighborhood of the transmission source node and the destination node. For this reason, the transmission source node tries to retransmit the packet as well as other interception nodes. If the proxy transmission by one of the interception nodes will be succeeded, other nodes stop the proxy transmission. In addition, the transmission source node and the interception nodes always try the proxy transmission in the case where there is no reply of the ACK packet from the destination node 102.

Note that, because the backoff procedure is a technology used widely in the wireless LAN system using the CSMA/CA method, the detailed descriptions concerning the backoff procedure are skipped.

PRIOR ART DOCUMENT

Patent Documents

Patent document 1: Japanese Patent Application Laid-Open No. 2008-227642
Patent document 2: Japanese Patent Application Laid-Open No. 2008-053794

Non-Patent Document

Non-patent literature 1: A. Masuda et al, "Contention based Cooperative Multiple Access for Wireless Packet Networks", IEEE Globecom Proceedings 2007 Vol. 3 pp. 1390-1394, USA, 2007

DISCLOSURE OF THE INVENTION

Technical Problems

The radio communication system and the path control system which executes the proxy transmission using the interception nodes mentioned above has a problem that a throughput of the communication system may degrade.

A first reason is because the interception nodes may execute the proxy transmission even when the proxy transmission is not needed. That is, even though the destination node normally transmitting the ACK packet, the interception nodes having poor communication condition with the destination node may not be able to receive the ACK packet. In this case, the interception nodes mistakenly judge that the retransmission is required, and may execute the proxy transmission.

A second reason is because unnecessary transmission band is consumed by the proxy transmissions. That is, as the number of the interception nodes which execute the proxy transmission increases, a probability of collision among the packets increases inevitably.

The patent document 1 discloses a configuration that the interception node retransmits the packet, in the case that the interception node did not receive the ACK packet from the destination node. Further, the radio communication system described in the patent document 1 advances a timing of retransmission of the packet in accordance with strength of a received signal strength indicator (RSSI) from a reception node becomes higher, when selecting the interception node which retransmits the packet. That is, the interception node determines the retransmission timing of the packet based on a communication condition and a threshold value between the reception node and the interception node.

However, according to the communication system described in the patent document 1, higher priority for the retransmission is given to an interception node having strong radio wave no smaller than a threshold value, even though the interception node is in a noisy condition and a quality of communication with the destination node is poor. As the result, according to the communication system described in the patent document 1, there is a problem that the throughput of the communication system may degrade, due to participation of the interception nodes which are in a poor quality of communication into the proxy transmissions.

In addition, a path control system according to the patent document 2 disclosed the path control system in which the transmission source node selects a path having a highest quality after comparing a quality of communication between the transmission source node and the destination node and the quality of communication between the destination node and the proxy transmission node. However, in the path control system described in the patent document 2, the transmission node needs to select a highest-quality path from a plurality of paths after the transmission node collects from other nodes the information for the path selection. As the result, according to the path control system described in the patent document 2, there is a problem that an overhead is required for the path calculation on the transmission node. Further, according to the path control system described in the patent document 2, because the control packet including information on the path selection is transmitted and received among the transmission source node and other nodes, there is also a problem that a throughput of the path control system may degrades.

The object of the present invention is to provide a technology for suppressing degradation of the throughput of the communication system.

Technical Solution

The communication device according to the present invention includes a reception means which receives and accumulates a first datum which a first device transmits addressing a second device and a second datum which the second device transmits, a transmission means which transmits the first datum to the second device, a quality index acquisition means which acquires a first index which is a quality of communication between the first device and the second device and a second index which is a quality of communication between the communication device and the second device, and a judgment means which forces to transmit the accumulated first datum to the second device when judging that the second index is better than the first index and a reception condition of the second datum shows that the second device does not receive normally the first datum.

A recording medium which stores a control program for a communication device, said program makes the communication device operate as a reception means which receives and accumulates a first datum which a first device transmits addressing a second device and a second datum which the second device transmits, a transmission means which transmits the first datum to the second device, a quality index acquisition means which acquires a first index which is a quality of communication between the first device and the second device and a second index which is a quality of communication between the communication device and the second device, and a judgment means which decides to transmit the accumulated first datum to the second device using the transmission means when judging that the second index is better than the first index and a reception condition of the second datum shows that the second device does not receive normally the first datum.

The communication method of the present invention is provided with a first step which receives and accumulates a first datum which a first device transmits addressing a second device and a second datum which the second device transmits, a second step which acquires a first index which is a quality of communication between the first device and the second device and a second index which is a quality of communication between the communication device and the second device, a third step which decides to transmit the accumulated first datum to the second device using the transmission means when judging that the second index is better than the first index and a reception condition of the second datum shows that the second device does not receive normally the first datum, and a fourth step which transmits the first datum to the second device.

The present invention brings an effect that it can suppress degradation of a throughput of the communication system.

BRIEF DESCRIPTION OF THE DRAWINGS

FIG. 5 is an example of a quality index table between nodes in the first exemplary embodiment.

FIG. 12 is a figure showing an example of a configuration on describing position information in a packet which is specified by IEEE 802.11 standard.

FIG. 14 is a configuration diagram of the wireless LAN system in which interception nodes are located.

FIG. 15 is a sequence chart showing a retransmission operation of the normal wireless LAN system that an interception node does not perform retransmitting.

FIG. 16 is a sequence chart showing a retransmission operation in the case that an interception node executes a proxy transmission as a proxy transmission node.

BEST MODE FOR CARRYING OUT THE INVENTION

First Exemplary Embodiment

The first exemplary embodiment of the present invention in detail with reference to the drawings will be described.

The present invention can apply to a random access radio communication system such as a CSMA/CA method. In the following descriptions, a typical Wireless LAN which conforms to IEEE 802.11 standard for instance as the random access radio communication system is described. However, the scope of the present invention is not limited to this. The present invention can apply to a radio communication system using methods such as UWB (Ultra Wide Band) and Zigbee (registered trademark).

FIG. 14 is a configuration diagram of the wireless LAN system in which the interception nodes are located. Referring to FIG. 14, the wireless LAN system includes a transmission source node 101 which is a transmission source of a transmission packet, a destination node 102 which is a destination of the transmission packet and interception nodes 103 to 109 which are located in the neighborhood of these nodes.

The interception node is a communication device which can receive the packets which the transmission source node 101 transmits to the destination node. Moreover, the interception node is a node which can be a candidate for the proxy transmission node which will be mentioned later.

At first, the configuration of the interception nodes 103 to 109 will be described.

Figure 1:
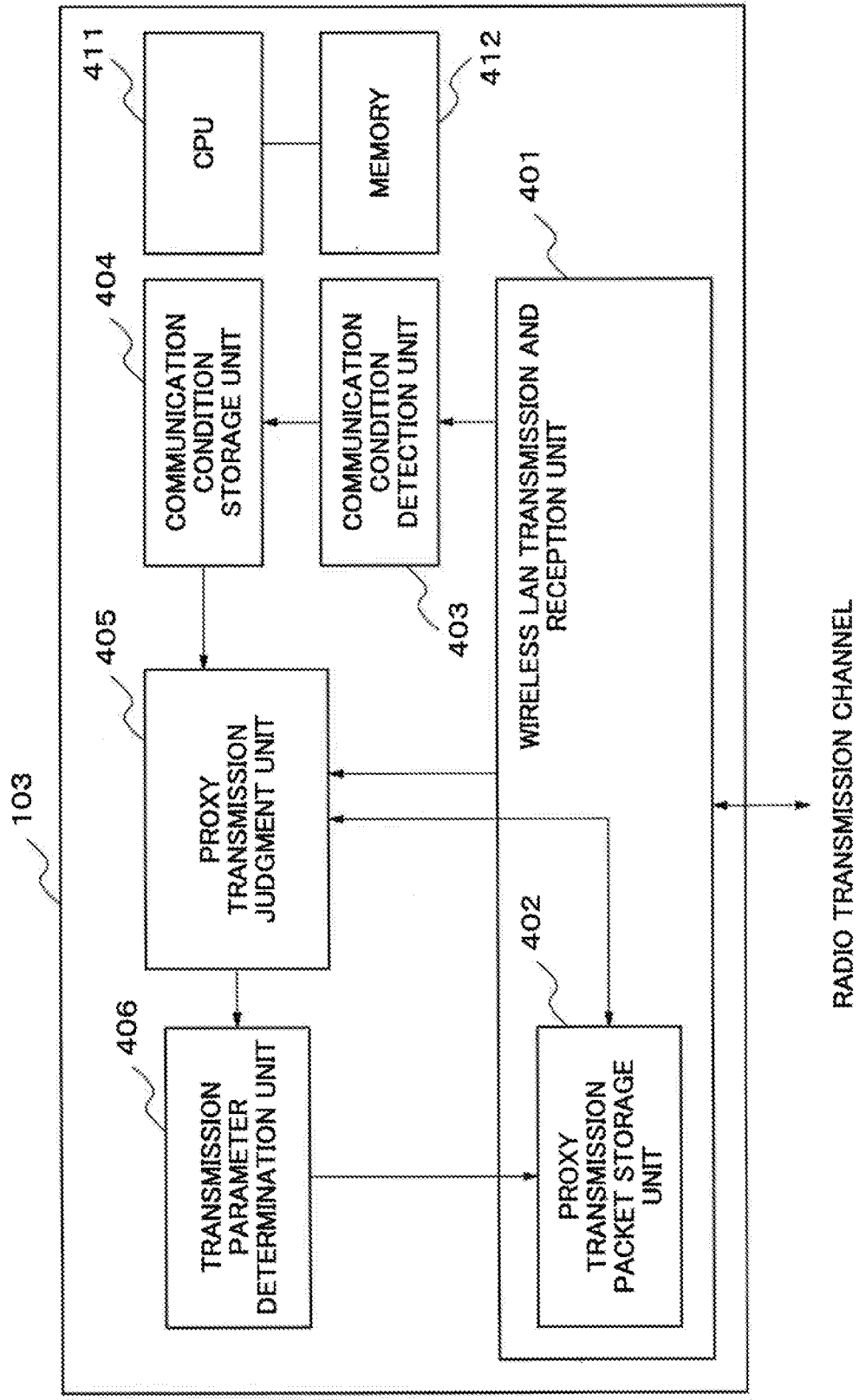
FIG. 1 is a figure showing a configuration of an interception node of the first exemplary embodiment.

FIG. 1 is a figure showing the configuration of the interception node 103 in the first exemplary embodiment. Followings describe the interception node 103. The interception nodes 104 to 109 also include the same structures and functions as the interception node 103. In addition, the transmission source node 101 may be equipped with the same structure as the interception node 103.

The interception node 103 in the wireless LAN system shown in FIG. 14 has the following function units in addition to the wireless LAN transmission and reception unit 401 which conforms to IEEE 802.11 standard.

That is, the interception node 103 shown in FIG. 1 includes a proxy transmission packet storage unit 402, a communication condition detection unit 403, a communication condition storage unit 404, a proxy transmission judgment unit 405 and a transmission parameter determination unit 406. In addition, the interception node 103 also includes a CPU (Central Processing Unit) 411 and a memory 412.

The wireless LAN transmission and reception unit 401 transmits and receives the wireless LAN packet conforming to IEEE 802.11 standard between other nodes via radio transmission channels. Further, the wireless LAN transmission and reception unit 401 has the proxy transmission packet storage unit 402 in it.

The proxy transmission packet storage unit 402 receives and stores packets which the transmission source node 101 transmitted to the destination node 102. In the case that the proxy transmission, judgment unit 405 judges to execute the proxy transmission in the interception node, the proxy transmission packet storage unit 402 receives the result of the judgment and transmission parameters via the transmission parameter determination unit 406. Then, the proxy transmission packet storage unit 402 executes the retransmission process according to the CSMA/CA procedure using the transmission parameters. Moreover, in the case that the proxy transmission judgment unit 405 judges not to execute the proxy transmission in the interception node, the proxy transmission packet storage unit 402 receives the result of the judgment from the proxy transmission judgment unit 405 and disposes the stored packet.

The communication condition detection unit 403 transmits and receives packets among other nodes. In addition, the communication condition detection unit 403 detects an index indicating a quality between the node and other nodes such as a SNR (Signal to Noise Ratio) of the received packet, and stores it in the communication condition storage unit 404 as quality index. The quality index is updated at a time of sending and receiving the packets. However, the update may be executed on each time of packet sending and receiving or intermittently. Note that, in the first exemplary embodiment, the SNR is exemplified for the index which indicates the quality between the nodes. However, the communication condition storage unit 404 may memorize other indexes, in the case that the index represents a quality of communication between the nodes.

The communication condition storage unit 404 stores the SNR detected by the communication condition detection unit 403 as the quality index table.

The proxy transmission judgment unit 405 judges whether the node executes the proxy transmission or not in the case that the node does not receive the ACK packet, which is corresponding to transmitted packet from the transmission source node, from the destination node. The detailed procedure of the judgment of the proxy transmission will be described later.

Before the judgment of the proxy transmission, the proxy transmission judgment unit 405 acquires a SNR between the node and the destination node 102 from the communication condition storage unit 404. Further, the proxy transmission judgment unit 405 acquires a SNR between the transmission source node 101 and the destination node 102 from the proxy transmission packet storage unit 402. The SNR between the node and the destination node 102 may be acquired at the time when the node communicates with the destination node.

Further, the proxy transmission packet storage unit 402 acquires the SNR information from the proxy transmission packet which the node stores.

In the case that the interception node judged to execute the proxy transmission, the proxy transmission judgment unit 405 notifies the transmission parameter determination unit 406 of the SNR between the node and the destination node acquired from the communication condition storage unit 404 as well as the result of the judgment. By the notification, the proxy transmission judgment unit 405 triggers the proxy transmission. On the contrary, in the case that the proxy transmission judgment unit 405 judged not to execute the proxy transmission, the proxy transmission judgment unit 405 notifies the proxy transmission packet storage unit 402 of the result of the judgment.

In the case that the proxy transmission judgment unit 405 judged to execute the proxy transmission, the transmission parameter determination unit 406 receives the notification and the information on the SNR between the node and the destination node from the proxy transmission judgment unit 405. Then, the transmission parameter determination unit 406 calculates the transmission parameter based on the SNR. The examples of the transmission parameter mentioned here include AIFS, CWmin and CWmax that are specified in IEEE 802.11 standard. However, other transmission parameters can be used if the parameters relate with the quality of the communication system.

The followings indicate formulas for calculating AIFS, CWmin and CWmax that are disclosed in the non-patent literature 1.

$$AIFS = \begin{cases} SIFS + 2\tau & (\Gamma \leq \gamma_a) \\ SIFS + \left\lfloor \tau - \frac{\tau(\gamma_b - \Gamma)}{\gamma_b - \gamma_a} \right\rfloor & (\gamma_a < \Gamma \leq \gamma_b) \\ SIFS + \tau & (\gamma_b < \Gamma) \end{cases}$$ [Formula (1)]

$$CW\min = \begin{cases} CW_1 & (\Gamma \leq \gamma_a) \\ CW_2 + \left\lfloor (CW_1 - CW_2)\frac{(\gamma_b - \Gamma)}{\gamma_b - \gamma_a} \right\rfloor & (\gamma_a < \Gamma \leq \gamma_b) \\ CW_2 & (\gamma_b < \Gamma) \end{cases}$$ [Formula (2)]

[Formula (3)]

$$CW\max = (CW\min + 1) \cdot 2^M - 1$$

where
τ is a slot time,
Γ is SNR, and
γa and γb are threshold values of Γ.

In addition, followings are examples of numerical values of the wireless LAN system which conforms to IEEE802.11b standard.

SIFS=10 [μsec],
τ=20 [μsec],
CW1=15 and CW2=7, and
γa=5 and γb=14.

With a program stored in the memory 412, the CPU 411 controls each unit in the interception node 103, that is, the wireless LAN communication unit part 401, the proxy transmission packet storage unit 402, the communication condition detection unit 403, the communication condition storage unit 404, the proxy transmission judgment unit 405 and the transmission parameter determination unit 406.

Operation of the First Exemplary Embodiment

Next, flows of the operation of the interception node will be described with reference to FIG. 2, FIG. 3 and FIG. 4.

A transmission source node, a destination node and interception nodes which set up the wireless LAN system are similar to the configuration of the wireless LAN system in FIG. 1. In addition, FIG. 16 shows the operational sequence of each node.

In the configuration of the wireless LAN system in FIG. 14, following descriptions mainly focus on the operations where each of the interception nodes 103 to 109 autonomously judges whether the proxy transmission is to be executed as the proxy transmission node or not, in the case that transmission of the transmission packet from the transmission source node 101 to the destination node 102 is failed.

In the first exemplary embodiment, the operation of the interception node is divided into three stages. At a first stage, an interception node acquires the quality of communication between the node and other nodes. At a second stage, the interception node judges whether the interception node can be a candidate for the proxy transmission node as a proxy transmission candidate node. At a third stage, the proxy transmission candidate node, which judged to execute the proxy transmission, executes the actual proxy transmission. The followings describe each of the steps from the first stage to the third stage.

First, the first stage will be described. FIG. 2 is the figure showing the first stage of the operation of the interception node in the first exemplary embodiment. At the first stage, interception nodes in the neighborhood of the transmission source node 101 acquire the quality index between the nodes which is criteria of the judgment for executing the proxy transmission. In the first exemplary embodiment, SNR is used as the quality index.

Figure 2:
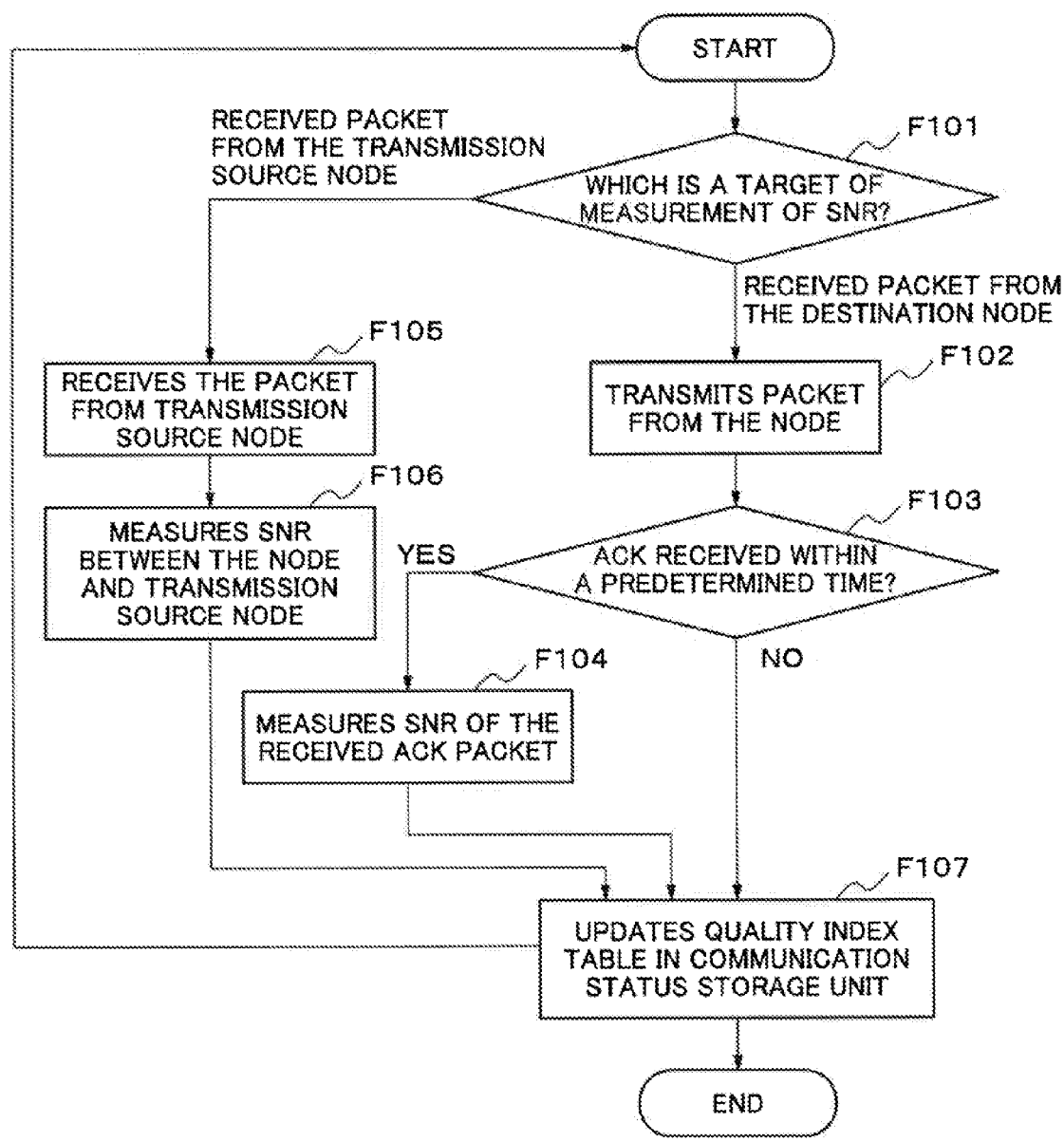
FIG. 2 is a flowchart showing a first stage of operation of the interception node in the first exemplary embodiment.

FIG. 2 indicates a procedure that the interception node measures the SNR of the packet received from other nodes, and then stores in the quality index table in the communication condition storage unit 404.

Note that, the SNR of the received packet is measured as the ratio between an electric power in the receiving frequency band of a reception signal and an electric power of only the datum signal among the reception signals. Further, the wireless LAN chips equipped with functions of measuring and outputting the SNR of the received packet are well known. Accordingly, the detailed descriptions of a method of measuring the SNR of the received packet are skipped.

The procedure of measuring the SNR of the received packet and storing in the quality index table in the case of measuring the SNR of the packet received from the transmission source node is different from in the case of measuring the SNR of the packet received from the destination node.

A procedure of storing the SNR in the quality index table, in the case of measuring the SNR (F101: received packet from the transmission source node) of the packet received from the transmission source node will be described. All the interception nodes execute the carrier sensing always or intermittently. Then, the interception node receives packets which the transmission source node transmitted to other nodes (F105). A broadcasting characteristic of the wireless packets is utilized at this procedure. The interception node measures the SNR of the received packets by the above-mentioned procedure (F106). Then, interception node updates the quality index table in the communication condition storage unit 404 based on the transmission source node of the received packets, measured values of the SNR and the time of the measurement (F107).

FIG. 5 is the figure showing an example on the quality index table between the nodes in the first exemplary embodiment. In the first exemplary embodiment, the quality index table will be a table including the SNR between the interception node and the transmission source node. In FIG. 5, the transmission source node is classified by an ID (Identifier). In addition, "measuring time" indicates a time when the SNR of the received signal was measured.

The value of the SNR may be an average value of a plurality of times of measurement, or a worst value, a best value or a latest value during a measuring period. In the case that errors such as the CRC (Cyclic Redundancy Check) error are detected at an inspection of the received packet, the interception node waits for an ACK packet corresponding to the packet. Then, the interception node acquires information on a transmission source of the packet which caused a reception error from a header of the ACK packet, and adds the information to the table.

Next, with reference to FIG. 2, a procedure of storing the SNR in the quality index table, in the case of measuring the SNR (F101: SNR measurement of the received packet from the destination node) between the node and the destination node is described.

The interception node 103 transmits the datum packet, which the node created, to the destination node (F102). Then, the interception node waits for an ACK packet which is a reply to the transmission packet (F103). In the case that the ACK packet could not be received within a predetermined time (F103: No), the interception node 103 supposes that the packet transmission between the node and the destination node of the packet is failed and records in the table (F107). On the other hand, in the case that the interception node receives the ACK packet within the predetermined time (F103: Yes), the interception node 103 measures the SNR of the received ACK packet by the same procedure as step F106 (F104), and records the information in the quality index table (F107). The quality index table can be prepared separately for a reception and a transmission corresponding to the transmission source node and the destination node respectively. The value of the SNR recorded in the quality index table can be an average value during a predetermined time or overwritten by the latest value of the SNR.

Next, the second stage of the operation of the interception node in the first exemplary embodiment will be described with reference to FIG. 3. At the second stage, the interception node autonomously judge whether the node can be a candidate node which executes the proxy transmission.

At first, a certain interception node receives a packet addressing other nodes (F201). The interception node measures the SNR between the transmission source node which transmitted the packet and the node by the communication condition detection unit 403 with the same procedure as step F106 (F202). Then, the interception node updates the quality index table of the communication condition storage unit 404 (F203). Up to here, the procedure is similar to the case of measuring the SNR of the packet which is received from the transmission source node described in FIG. 2.

Here, the communication quality information which is updated in step F203 is not used for the following judgment of the proxy transmission. However, the updated communication quality information is utilized in the case of judging whether the proxy transmission of the packet addressing the transmission source node is to be executed or not.

Next, the proxy transmission packet storage unit 402 stores the packets other than the ACK packet among the received packets (F204). Then, the proxy transmission packet storage unit 402 waits until the ACK packet is replied from the destination node (F205).

In the case of receiving the ACK packet from the destination node at the node within a predetermined waiting time after a reception of the packets addressing other nodes (F205: Yes), the proxy transmission judgment unit 405 judges that the packet transmission from the transmission source node to the destination node is successful. In this case, because the interception node does not need to execute the proxy transmission, the proxy transmission packet storage unit 402 disposes the stored packet (F206), and judges not to execute the proxy transmission (F211).

On the other hand, in the case that the ACK packet does not arrive at the node even if the predetermined waiting time has passed, the proxy transmission judgment unit 405 judges that the packet transmission from the transmission source node to the destination node failed (F205: No). Then, in order to judge whether the proxy transmission is to be executed or not, two kinds of information is acquired. The first information is the quality index (a) between the transmission source node 101 and the destination node 102 (F207). In the first exemplary embodiment, SNR of the packet received from the destination node at the transmission source node (hereinafter, referred to as SNR (a)) is used as the quality index (a).

Figure 11:
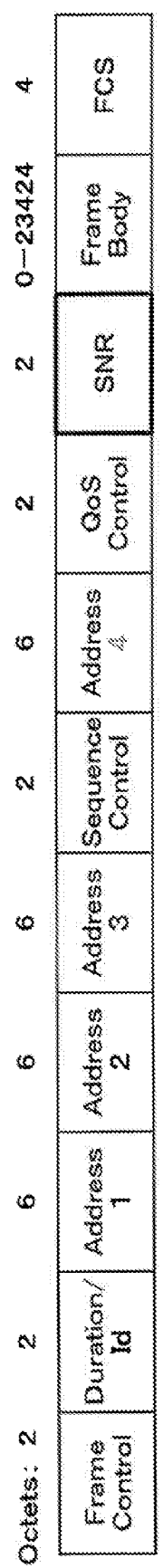
FIG. 11 is a figure showing a configuration on describing a SNR of a received packet at a transmission source node in the packet which is specified by IEEE 802.11 standard.

Here, a SNR (a) is recorded in the packet specified by IEEE 802.11 standard. FIG. 11 is the figure showing a configuration on how to include the SNR of the received packet at the transmission source node in the packet which is specified by IEEE 802.11 standard. In the first exemplary embodiment, the SNR (a) is recorded in the SNR field which is located between a QoS (Quality of Service) control field and a frame body field.

After writing the SNR (a), which is a SNR of the datum received from the destination node 102, in the packet, the transmission source node 101 transmits the packet to the destination node 102. The node receives the packet transmitted from the transmission source node 101 to the destination node 102, and stores the packet in the proxy transmission packet storage unit 402.

The proxy transmission judgment unit 405 retrieves the SNR (a) from the packet, which was received from the transmission source node and was stored in the proxy transmission packet storage unit 402 (F207). Note that, it is supposed that the quality index was recorded in the SNR field, which is located between the QoS (Quality of Service) control field and the frame body field of the packet. However, the SNR can be recorded at another position in the packet.

The second information is a quality index (b) between the node and the destination node 102 (F208). In the first exemplary embodiment, a SNR of the packet in the node received from the destination node 102 (hereinafter, referred to as SNR (b)) is used as the quality index (b). The proxy transmission judgment unit 405 retrieves the SNR (b) from the quality index table stored in the communication condition storage unit 404 in the node (F208). Note that, the orders of step F207 and step F208 can be reversed. Then, the interception node compares the SNR (a) and the SNR (b) (F209). As the result, the node judges to execute the proxy transmission (F210), in the case that the quality index (b) is better than the other, that is, the SNR (b) is higher than the SNR (a) (F209: Yes). Hereinafter, a "proxy transmission candidate node" denotes an interception node which judged to execute the proxy transmission. On the other hand, in the case that the quality index (a) is better than the quality index (b) (F209: No), the node disposes the stored received packet (F206) and does not execute the proxy transmission (F211).

Next, the third stage of the operation of the interception node in the first exemplary embodiment will be described with reference to FIG. 4. FIG. 4 indicates the proxy transmission operation, in the case that the interception node becomes the proxy transmission candidate node.

Figure 3:
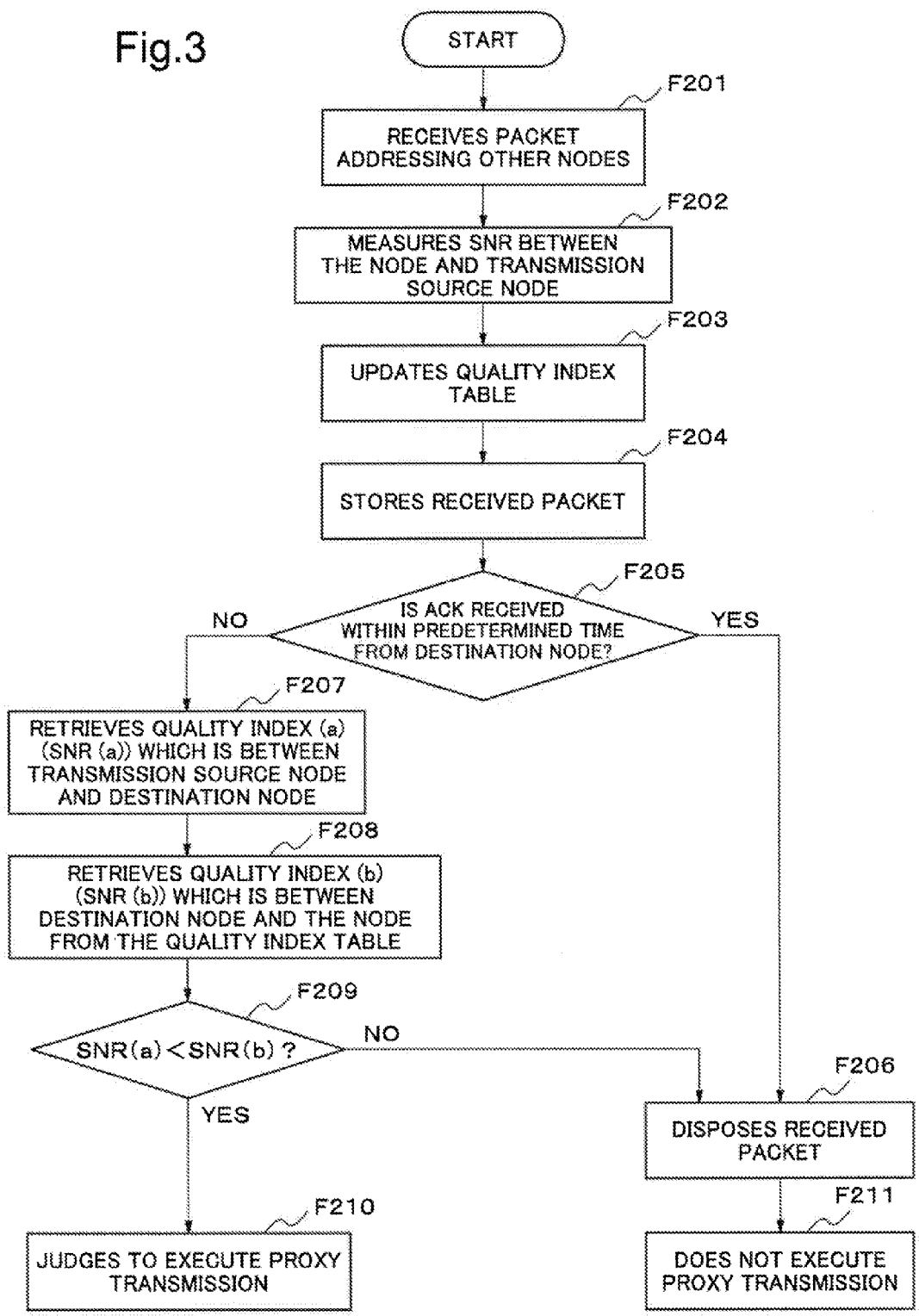
FIG. 3 is a flowchart showing a second stage of operation of the interception node in the first exemplary embodiment.

In the case that the node judges that the interception node can execute the proxy transmission and the node becomes the proxy transmission candidate node in F210 of FIG. 3, the proxy transmission judgment unit 405 notifies the transmission parameter determination unit 406 of the result. The transmission parameter determination unit 406 acquires the quality index between the node and the destination node 102, which is the SNR (b), from the communication condition storage unit 404 via the proxy transmission judgment unit 405 (F301).

The transmission parameter determination unit 406 calculates AIFS, CWmin and CWmax, which are the transmission parameters, from acquired SNR using the formula (1) to formula (3) (F302).

After that, the wireless LAN transmission and reception unit enters into the backoff operation, generates a random number which is between 0 to CWmin (F303) and waits during the period of AIFS (F304). Then, the wireless LAN transmission and reception unit starts the count down of the backoff timer (F305).

During the count down of the backoff timer which is used for the proxy transmission, the proxy transmission candidate node checks whether the packet transmission from other nodes is detected or not before the timer reaches zero (F310: No to F306: No and to F310).

When the timer reaches zero (F306: Yes) without detecting the packet transmission from other nodes, the proxy transmission candidate node acquires a transmission right. Hereinafter, "proxy transmission node" denotes a proxy transmission candidate node which acquired the transmission right. The proxy transmission node transmits the stored proxy transmission packet (F307). At that time, the proxy transmission node sets the transmission source of the transmission packet as the original transmission source node 101 instead of the node. Then, the proxy transmission node waits for a reception of the ACK packet in reply to the transmitted proxy transmission packet (F308). In the case that the proxy transmission node receives the ACK packet from the destination node 102 within the predetermined time (F308: Yes), the proxy transmission node judges that the proxy transmission has succeeded. Then, the proxy transmission node disposes of the packet held in the proxy transmission packet storage unit 402 (F316). In the case that the proxy transmission node cannot receive the ACK packet within the predetermined time, the proxy transmission node records the fact on the quality index table of the communication information storage unit 404 and updates the quality index table (F309). Then, the proxy transmission node disposes the packet held in the proxy transmission packet storage unit 402 (F320), returns to F302 and repeats the step after F302.

On the other hand, in the case that the proxy transmission candidate node detects the packet transmission from other nodes during the back off count down for the proxy transmission (F310: Yes), the proxy transmission candidate node suspends the count down of the backoff timer (F311). The proxy transmission candidate node investigates whether the packet is the target packet of the proxy transmission or not based on addresses of the transmission source node and the destination node and the sequence number of the packet header (F312). In the case that the detected packet is a target packet of the proxy transmission (F312: Yes), the proxy transmission candidate node waits for the detection of the ACK packet which the destination node transmitted in response to the packet (F315). In the case that the proxy transmission candidate node detects the ACK packet within the predetermined time (F315: Yes), the proxy transmission candidate node judges that the proxy transmission by other nodes has succeeded. Then, the proxy transmission candidate node does not execute the proxy transmission at the node and disposes the stored packet (F316).

In the case that the proxy transmission candidate node does not receive the ACK packet corresponding to the packet detected in step F310 within the predetermined time (F315: No), the proxy transmission candidate node restarts the count down of the backoff timer (F313). Further, also in the case that the received packet is not the proxy transmission packet (F312: No), the proxy transmission candidate node restarts the count down of the backoff timer (F313). After that, the procedure returns to F310, and the procedure of detecting the packet transmission from other nodes is repeated.

Figure 4:
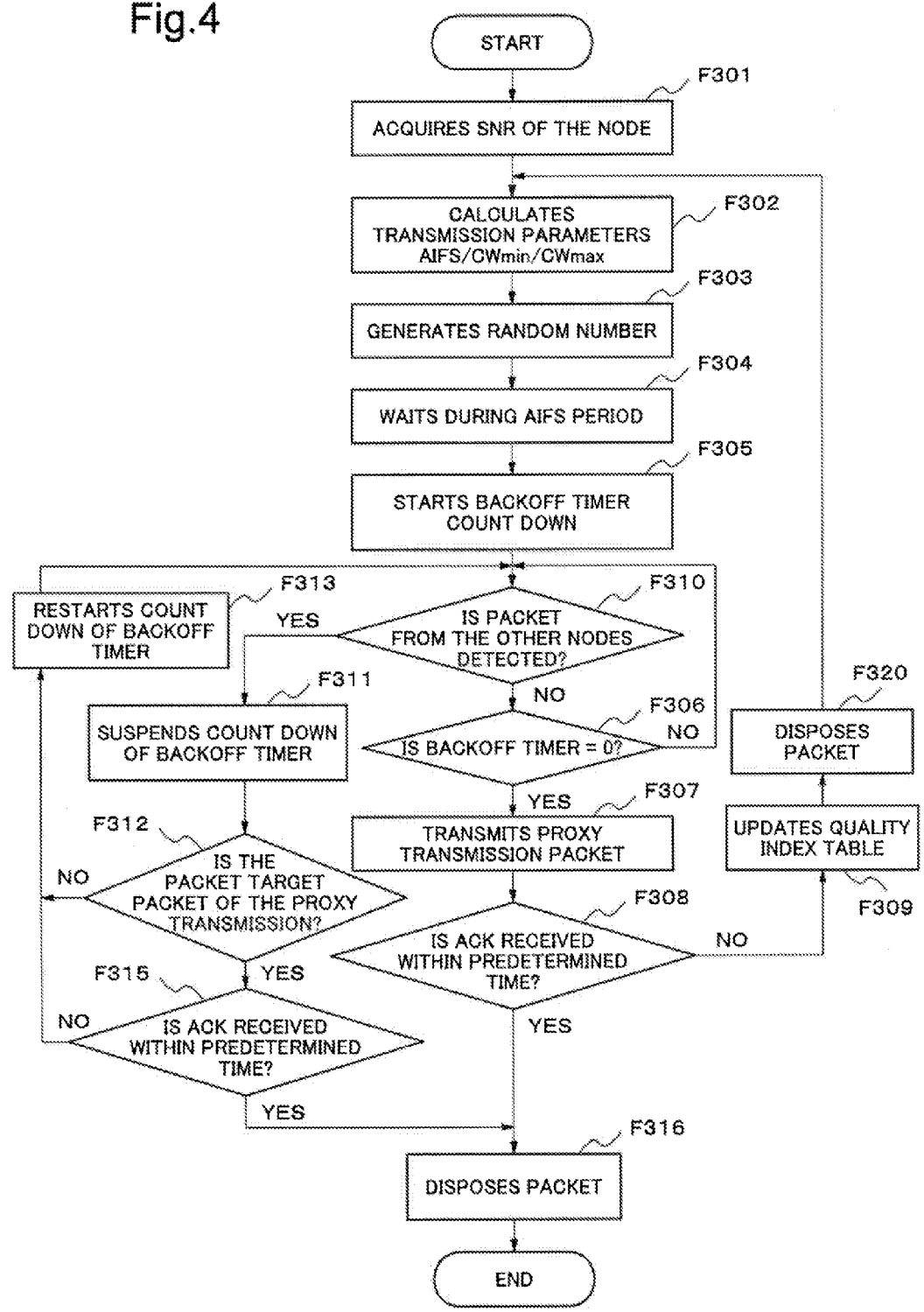
FIG. 4 is a flowchart showing a third stage of operation of the interception node in the first exemplary embodiment.

Note that, the transmission source node 101 can also execute the proxy transmission operation following to the procedure shown in FIG. 2, FIG. 3 and FIG. 4, in the case that the transmission source node 101 has the same configuration as the interception node.

In addition, according to the first exemplary embodiment, it is judged that a reception of the packet failed at the destination node, in the case that the ACK packet which the destination node transmitted within the predetermined time is not detected at the proxy transmission candidate node. However, it may also be judged that a reception of the packet failed at the destination node, in the case of detecting a NACK (negative acknowledgement) packet, which the destination node transmitted, within the predetermined time at the proxy transmission node.

Effects of the First Exemplary Embodiment

As described above, according to the first exemplary embodiment, the interception node judges whether a SNR between the node and the destination node is better than a SNR between the transmission source node and the destination node or not, and assigns the node as the candidate of the proxy transmission. Then, the proxy transmission node which acquired the transmission right transmits the packet to the destination node. Further, because each of interception nodes is executing these operations autonomously, the proxy transmission with the high success rate is realized, without concentrating the process on a specific node or without exchanging control packets between the nodes. Accordingly, the first exemplary embodiment can suppress degradation of the throughput of the communication system.

Second Exemplary Embodiment

Next, the second exemplary embodiment will be described.

In the first exemplary embodiment described above, a signal to noise ratio (SNR) between the nodes is used as the quality index.

When a propagation distance of the radio wave becomes longer, radio wave becomes difficult to reach. As the result, the quality of communication tends to deteriorate as the distance between the transmission source node and the destination node becomes longer. Accordingly, a distance between the nodes can be used as a quality index. Therefore, in the second exemplary embodiment, the distance between the nodes is adapted as the communication quality information.

Figure 6:
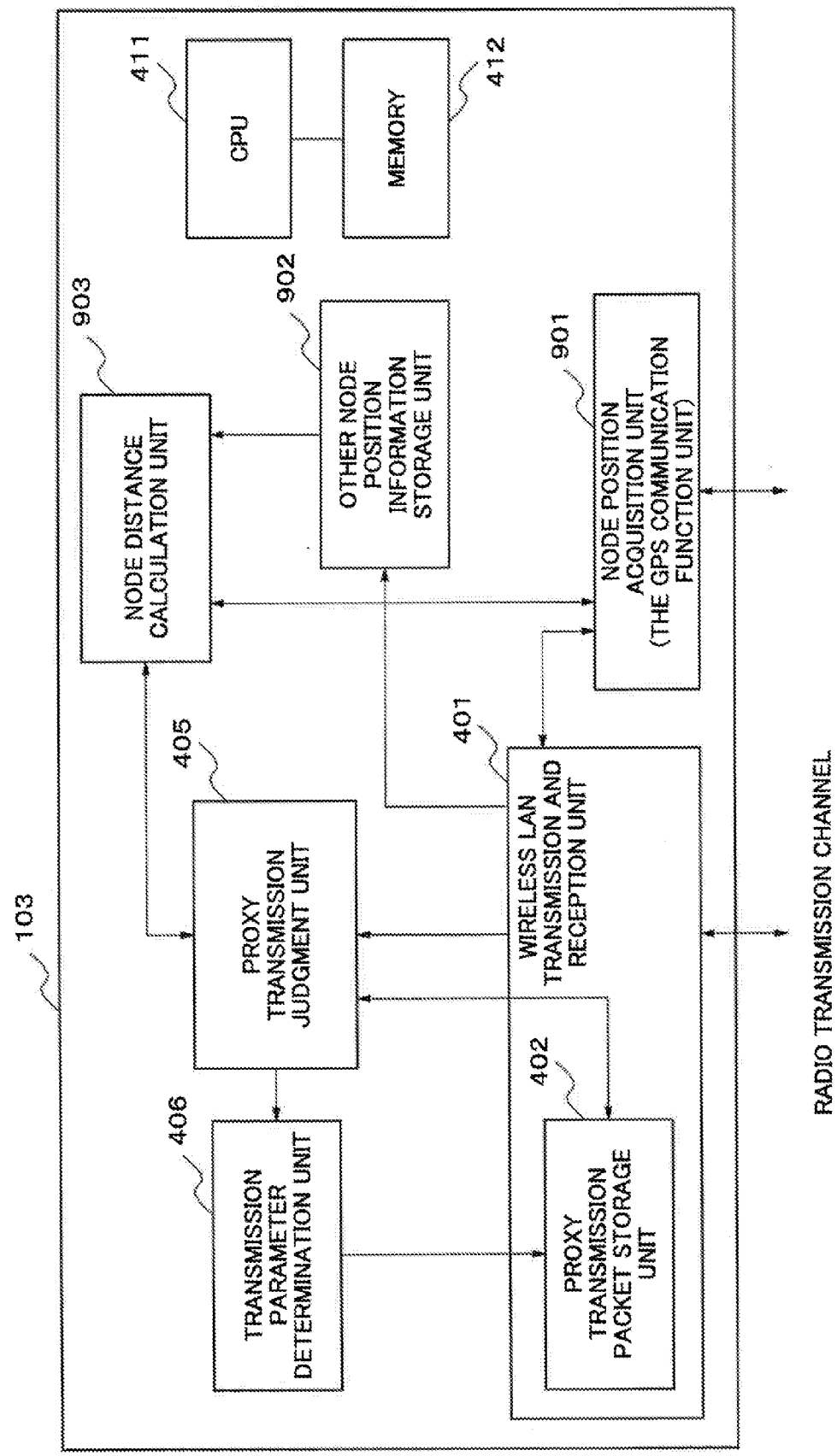
FIG. 6 is a figure showing a configuration of the interception node in the second exemplary embodiment.

FIG. 6 indicates the configuration of the interception node 103 of the second exemplary embodiment. The interception node of the second exemplary embodiment includes a node position acquisition unit 901, an other node position information storage unit 902 and a node distance calculation unit 903, instead of the communication condition detection unit 403 and the communication condition storage unit 404 of the interception node described in FIG. 1.

In the second exemplary embodiment, by a positioning function using GPS (Global Positioning System), the node position acquisition unit 901 acquires position information on the node. All the nodes of which the system of the second exemplary embodiment includes acquire the position information on the node respectively, and set position information in the transmitting packets.

Besides, the position information may be recorded in the packet specified by IEEE 802.11 standard. FIG. 12 is a figure showing the configuration on how to include position information in the packet which is specified by IEEE 802.11 standard. In the second exemplary embodiment, a position information field is set between the QoS (Quality of Service) control field and the frame body field. Although the size of a position information field is set to two octets in FIG. 12, it is possible to enlarge the size according to precision of the required position information. After recording the position information of the node in the position information field of the packet, the node transmits the packet. Each node which received the packet retrieves the position information of the node that transmitted the packet, from the position information field of the packet which is shown in FIG. 12.

The wireless LAN transmission and reception unit 401 requests the position information on the node to the node position acquisition unit 901, in the case that the transmission source of the packet transmission is the node. The node position acquisition unit 901 retrieves the position information and passes the position information to the wireless LAN transmission and reception unit 401. The wireless LAN transmission and reception unit 401 records the position information in the transmission packet. The position information includes such as latitude, longitude and height. However, any kind of information other than the position information described above is applicable in the second exemplary embodiment if calculating the distance between the positions is possible.

The other node position information storage unit 902 stores the position information of the transmission source node which is recorded in the packet, which other interception nodes transmitted and the node received. By the request from the proxy transmission judgment unit 405, the other node position information storage unit 902 retrieves the position information on the transmission source node from the position information field shown in FIG. 12 of the received packet. The position information on the transmission source node is passed to the node distance calculation unit 903, and the position information is utilized in the case of calculating the distance between the nodes.

The proxy transmission judgment unit 405 directs the calculation of the distance between the node and the destination node 102, and the distance between the transmission source node 101 and the destination node 102, to the node distance calculation unit 903.

The node distance calculation unit 903 retrieves the position information on the transmission source node 101 and the destination node 102 from the other node position information storage unit 902, and the position information on the node from the node position acquisition unit 901. Then, the node distance calculation unit 903 calculates the distance between the node and the destination node 102, and the distance between the transmission source node 101 and the destination node 102, using the retrieved position information, and notifies the proxy transmission judgment unit 405 of these distances.

The CPU 411 controls each part of the interception node 103 by the program stored in the memory 412. That is, the CPU 411 controls the wireless LAN communication unit part 401, the proxy transmission packet storage unit 402, the node distance calculation unit 903, the proxy transmission judgment unit 405, the transmission parameter determination unit 406, the node position acquisition unit 901 and the other node position information storage unit 902.

Further, although the GPS is described as an example of the positioning function of the node position acquisition unit 901 in the second exemplary embodiment, the other positioning functions can be used as long as the position information can be acquired. As another acquisition method of the position information on the node, a procedure where the wireless base station acquires the position information on subordinate wireless LAN nodes can be applied as is specified by IEEE802.11k standard. Further, the position information on the nodes can be kept in advance in the node. Alternatively, the position information on the nodes can be set directly from outside to the node position acquisition unit 901.

Next, the procedure of executing the judgment of whether the proxy transmission candidate nodes 103 to 109 in the second exemplary embodiment execute the proxy transmission or not will be described with referring to FIG. 7 and FIG. 8.

Figure 7:
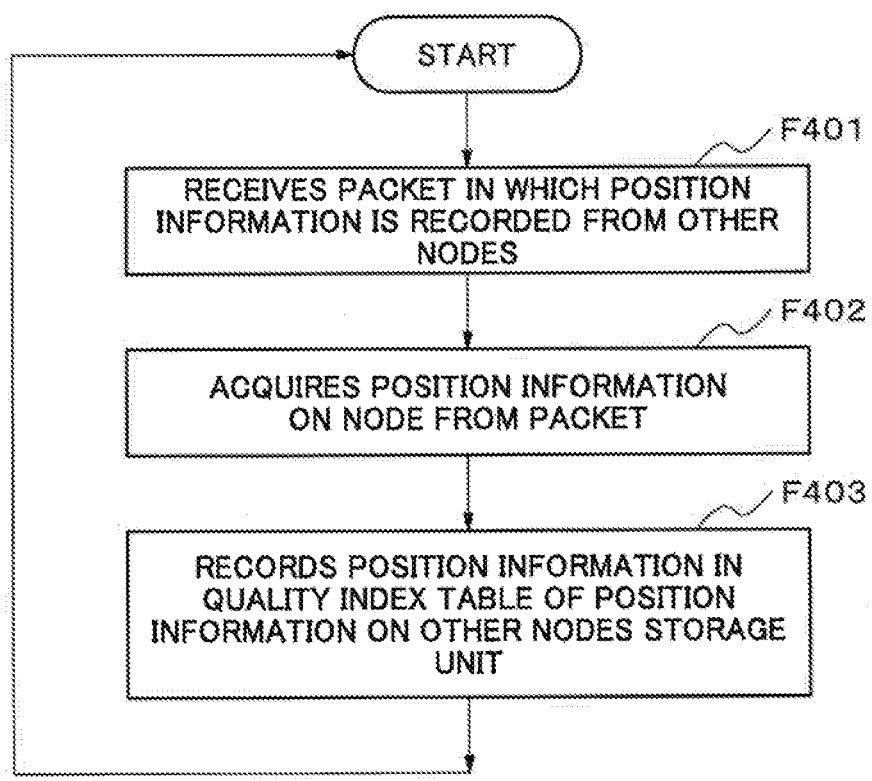
FIG. 7 is a flowchart showing operation of acquiring position information on other nodes in the second exemplary embodiment.

FIG. 7 is the figure showing the operation of acquiring the position information on other nodes in the second exemplary embodiment. The interception nodes 103 to 109 described in FIG. 14 execute the operation.

At first, the interception node receives a packet in which the position information is recorded, from other node (F401). In that case, the interception node also receives a packet which is not addressing to the node. The interception node retrieves position information from the received packet (F402). Then, the interception node correlates the acquired position information to an ID of the node which transmitted the position information, and stores the acquired position information in the quality index table of the other node position information storage unit 902 (F403). This operation is executed whenever the interception node receives a packet. As the result, the position information stored in the quality index table of the other node position information storage unit 902 is always kept in the latest status.

Next, the practical operation will be described in detail in the case of judging whether the node executes the proxy transmission or not with referring to FIG. 8.

Figure 8:
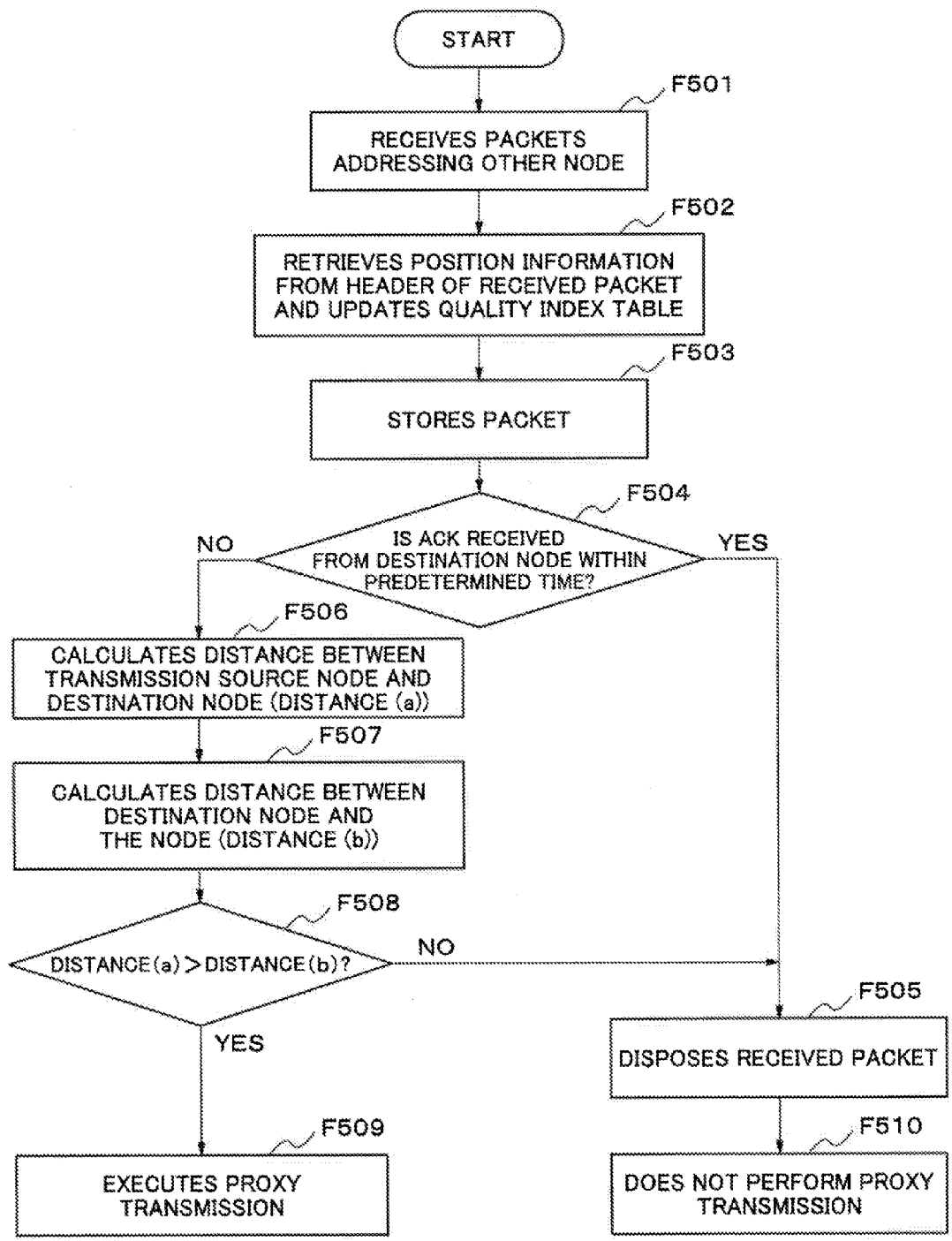
FIG. 8 is a flowchart showing a procedure of a proxy transmission judgment of the interception node in the second exemplary embodiment.

FIG. 8 is the figure showing the operation of the proxy transmission judgment of the interception node in the second exemplary embodiment.

The node, which is one of the interception nodes, receives a packet which other node transmitted to another node (F501). The wireless LAN transmission and reception unit 401 extracts the position information from the received packet and passes the position information to the other node position information storage unit 902.

An example of the configuration of the position information on the packet is already described in FIG. 12. A node which transmits the packet recorded the position information on the node in the position information field of the packet, and then transmits the packet.

The other node position information storage unit 902 updates the quality index table using the position information which is retrieved from the received packet (F502). In addition, the proxy transmission packet storage unit 402 stores the received packet (F503).

Next, the node waits for a reception of an ACK packet from the destination node corresponding to the stored packet (F504). When the node receives the ACK packet within a predetermined time (F504: Yes), the node disposes the stored packet (F505). Further, the node judges not to execute the proxy retransmission (F510). In the case that the ACK packet is not received even if the predetermined time has passed, the node enters into the judgment procedure of whether the retransmission will be performed or not (F504: No).

At first, the proxy transmission judgment unit 405 requests the node distance calculation unit 903 to calculate a distance (a) between the transmission source node and the destination node, and a distance (b) between the destination node and the node. Following to the request, the node distance calculation unit 903 requests the other node position information storage unit 902, and the node position acquisition unit 901, to provide the position information. The node distance calculation unit 903 calculates the distance (a) between the transmission source node and the destination node, and the distance (b) between the destination node and the node, from the provided position information (F506 and F507). Note that, because a method of calculating a distance between two spots using latitude, longitude and height of two spots is provided in GPS receivers and the others and is a well known art, the description of a procedure of calculating the distance will be omitted.

In case of calculating the distance (a) between the transmission source node and the destination node, the node distance calculation unit 903 calculates the distance from the position information on the transmission source node 101 and the destination node 102, that are retrieved from the quality index table of the other node position information storage unit 902. Then, the node distance calculation unit 903 notifies the proxy transmission judgment unit 405 of the calculated result of the distance. When calculating the distance (b) between the destination node and the node, the node distance calculation unit 903 calculates the distance (b) from the position of the node retrieved from the node position acquisition unit 901 and the position information on the destination node 102 retrieved from the quality index table of the other node position information storage unit 902 (F507). The acquiring order of the distance (a) and the distance (b) can be reversed.

Then, the proxy transmission judgment unit 405 compares the distance (a) and the distance (b) (F508). In the case that the distance (b) is shorter than the distance (a) (F508: Yes), it is supposed that the node is closer to the destination node 102 than the transmission source node 101, and therefore, probability of successful retransmission is supposed to be high. Accordingly, in the case that the distance (b) is shorter than the distance (a), the proxy transmission judgment unit 405 decides that the node executes the proxy transmission as the proxy transmission candidate node (F508). In the case that the distance (b) is longer than the distance (a), the proxy transmission judgment unit 405 judges that the node is located farther from the destination node than from the transmission source node 101. In this case, it is supposed that probability of successful retransmission is low. Accordingly, in the case that the distance (b) is longer than the distance (a), the proxy transmission judgment unit 405 disposes the received packet in the proxy transmission packet storage unit 402 (F505), and decides not to execute the proxy transmission (F510).

In the case that the interception node decides to execute the proxy transmission, thereafter, the interception node operates following to the flows described in FIG. 4 of the first exemplary embodiment. Whereas the quality index used for the decision is the SNR in the first exemplary embodiment, the distance between the node and the destination node in the second exemplary embodiment. However, because it is similar to FIG. 4 described in the first exemplary embodiment other than the difference of the quality index, the descriptions of the procedure after the judgment to execute the proxy transmission in FIG. 8 will be omitted.

As described above, according to the second exemplary embodiment, a distance between the node and the destination node and a distance between the transmission source node and the destination node, which can be easily calculated, are used as quality indexes for the judgment of the proxy transmission. These quality indexes are calculated by the node position acquisition unit 901, the other node position information storage unit 902 and the node distance calculation unit 903. Then, whether the node can be the proxy transmission candidate node or not is judged by comparing the distance between the node and the destination node and the distance between the transmission source node and the destination node. Accordingly, in the second exemplary embodiment, because those interception nodes which may communicate with the destination nodes with poor quality of communication due to long distance to the destination node do not participate in the proxy transmission, the success rate of the proxy transmission can be increased and degradation of the throughput of the communication system can be suppressed.

Third Exemplary Embodiment

Next, the third exemplary embodiment will be described.

The third exemplary embodiment uses a QoS (Quality of Service) class which is required for each packet as a judgment index, in the case of judging whether the proxy transmission is to be executed or not at the first and the second exemplary embodiment mentioned above. The QoS class is an index which indicates priority in the case of transmitting each packet.

Figure 9:
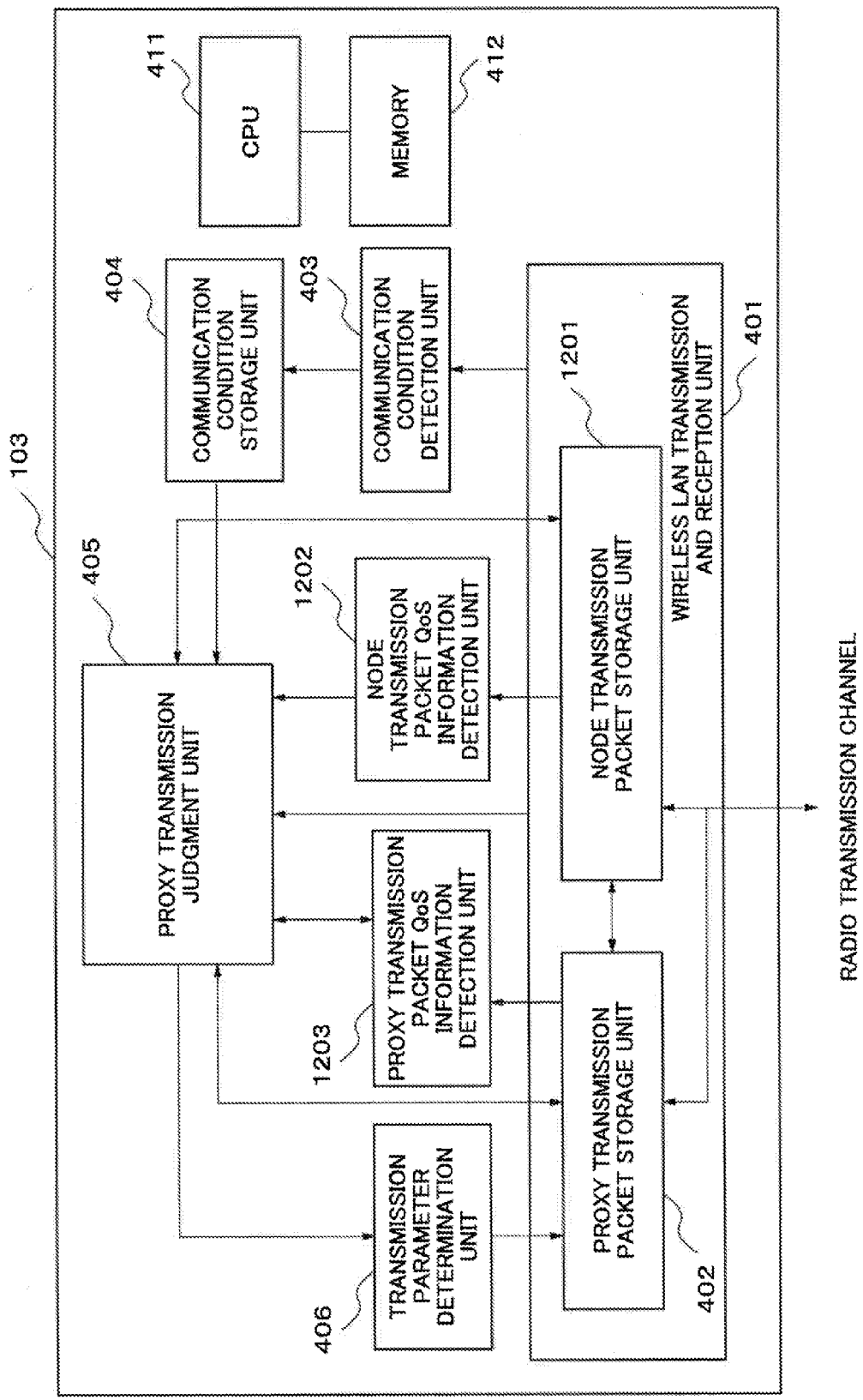
FIG. 9 is a figure showing a configuration of the interception node in the third exemplary embodiment.

FIG. 9 is the figure showing the configuration of the interception node in the third exemplary embodiment. The interception node 103 shown in FIG. 9 differs from the interception node 103 in the first exemplary embodiment shown in FIG. 1 in that the former one further includes a node transmission packet storage unit 1201, a node transmission packet QoS information detection unit 1202 and a proxy transmission packet QoS information detection unit 1203.

The node transmission packet storage unit 1201 is a transmission buffer of the packets which the node created. In the case of executing the proxy transmission, the node transmission packet storage unit 1201 informs the proxy transmission judgment unit 405 if a transmission packet exists in a transmission buffer. In the case that the transmission packet exists in the transmission buffer of the node transmission packet storage unit 1201, the node transmission packet QoS information detection unit 1202 detects the QoS class from the header of the transmission packets. The QoS class is designated in the field as TID (Traffic ID) of the packet header following to IEEE802.11e standard as an example.

The node transmission packet QoS information detection unit 1202 informs the information on the detected QoS class to the proxy transmission judgment unit 405.

The proxy transmission packet QoS information detection unit 1203 detects the QoS class of the proxy transmission packet from the packet header in the proxy transmission packet storage unit 402 and notifies the proxy transmission judgment unit 405.

The proxy transmission judgment unit 405 acquires the QoS class respectively from the node transmission packet QoS information detection unit 1202 and from the proxy transmission packet QoS information detection unit 1203. Then, the proxy transmission judgment unit 405 decides to select and transmit a packet with the higher QoS class. In the case that the QoS classes of the acquired packets are the same, the transmission packet of the node may be transmitted or the transmitting the proxy transmission packet may precede.

The proxy transmission judgment unit 405 notifies the result of the judgment to the node transmission packet QoS information detection unit 1202 and the proxy transmission packet QoS information detection unit 1203.

With the program stored in the memory 412, the CPU 411 controls each unit in the interception node 103.

Next, in the third exemplary embodiment, the operation of judging whether the interception node can be the proxy transmission node or not will be described.

Figure 10:
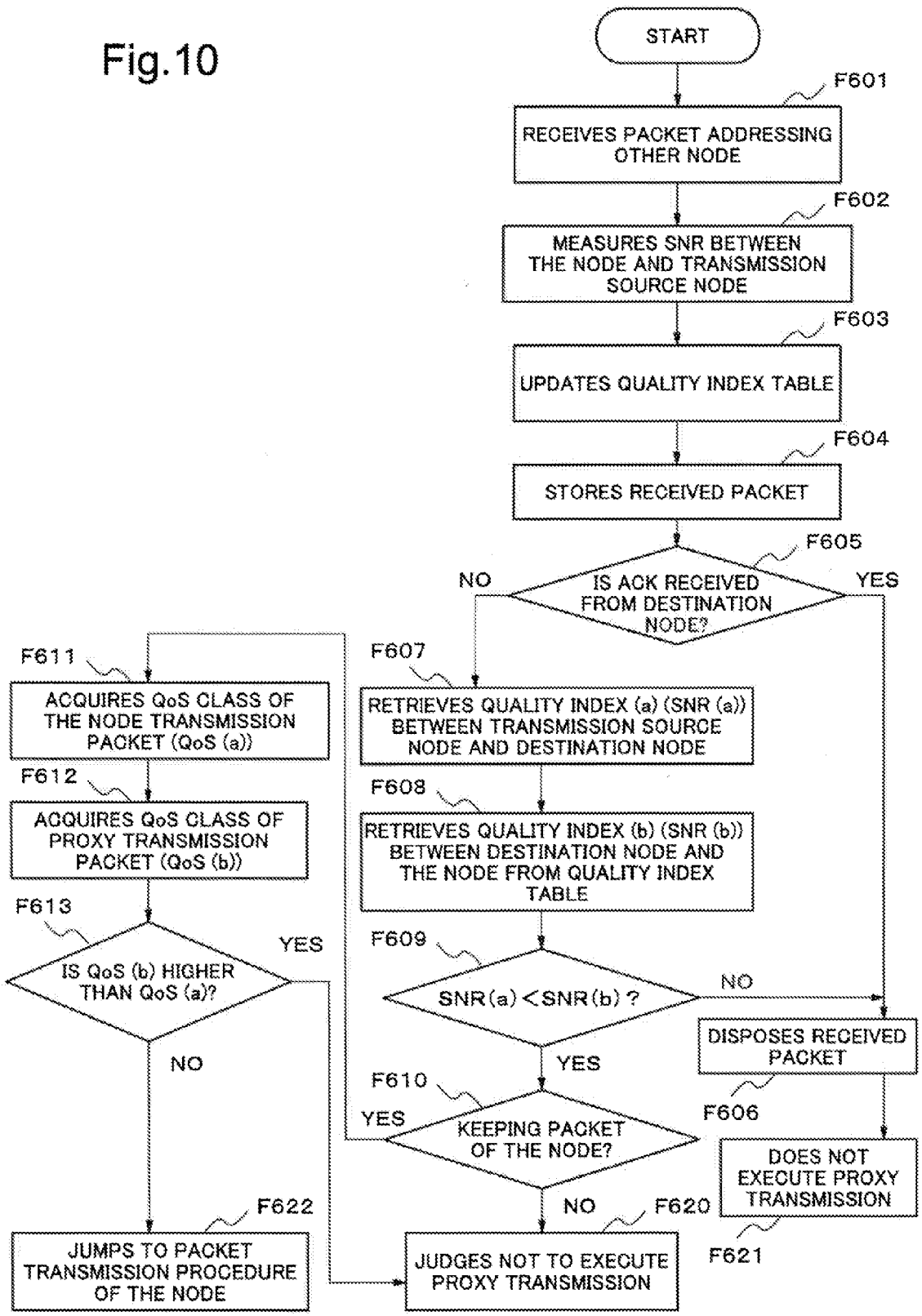
FIG. 10 is a flowchart showing a procedure of a proxy transmission judgment in the third exemplary embodiment.

FIG. 10 is the figure showing the procedure of the proxy transmission judgment in the third exemplary embodiment.

In FIG. 10, because the procedure from the step (F601) of receiving the packets addressing other nodes which the interception node transmitted, to the step (F609) of comparing the quality index of communication between the node and the destination node and the quality index of communication between the transmission source node and the destination node are the same as step F201 to step F209 in FIG. 3 described in the first exemplary embodiment, their descriptions are omitted.

In the third exemplary embodiment, a procedure of the steps of F610 to F613 are added to the figure showing the second stage of the operation of the interception node shown in FIG. 3.

In steps F601 to F609 in FIG. 10, the SNR which was described in the first exemplary embodiment is used as the quality index. However, as the quality index in these steps, the distance between the nodes described in the second exemplary embodiment or parameters representing other quality indexes can be adopted.

In FIG. 10, in the case that the quality index between the node and the destination node 102 is judged to be better than the quality index between the transmission source node 101 and the destination node 102 (F609: Yes), the procedure proceeds to step F610 and the following steps. In the procedure after step F610, the QoS class of the transmission packet of the node and the received packet received from other nodes are compared.

The proxy transmission judgment unit 405 checks the presence of the packet in the node transmission packet storage unit 1201 (F610). In the case that the transmission packet which the node created exists (F610: Yes), then a QoS class (hereinafter, referred to as QoS (a)) of the node transmission packet is acquired, via the node transmission packet QoS information detection unit 1202, from the packet header stored in the node transmission packet storage unit 1201 (F611). In addition, the proxy transmission judgment unit 405 acquires a QoS class (b) of the proxy transmission packet (hereinafter, referred to as QoS (b)), via the proxy transmission packet QoS information detection unit 1203 (F612).

Then, the proxy transmission judgment unit 405 compares the QoS (a) and the QoS (b) (F613), and decides to transmit the packet having a higher QoS class of them. In the case that QoS class of the QoS (a) is higher than that of the QoS (b) (F613: Yes), the node can be the proxy transmission candidate node of the received packet. On the other hand, in the case that the QoS class of the QoS (a) is lower than that of the QoS (b) (F613: No), the node executes the packet transmission procedure of the node (F622) so to that transmission of the datum of the node precedes. In the case that QoS class of the QoS (a) and the QoS (b) are the same, the node may transmit the transmission packet of the node or may give priority on transmitting the proxy transmission packet.

In the case that the transmission packet which the node created does not exist (F610: No), the node decides that the node becomes a proxy transmission candidate node and executes the proxy transmission.

Note that, the procedure of transmitting the proxy transmission packet after deciding to execute the proxy transmission is the same as that of the first exemplary embodiment and the second exemplary embodiment, the descriptions in here are omitted.

As described above, according to the third exemplary embodiment, the interception node judges whether the proxy transmission is to be executed or not by a comparison of the QoS class of the packet in addition to the comparison of the quality index of between the node and the destination node and the quality index of between the transmission source node and the destination node. As the result, improving the throughput of the communication system as well as satisfying the QoS request of the transmitted packet on each node becomes possible.

Figure 13:
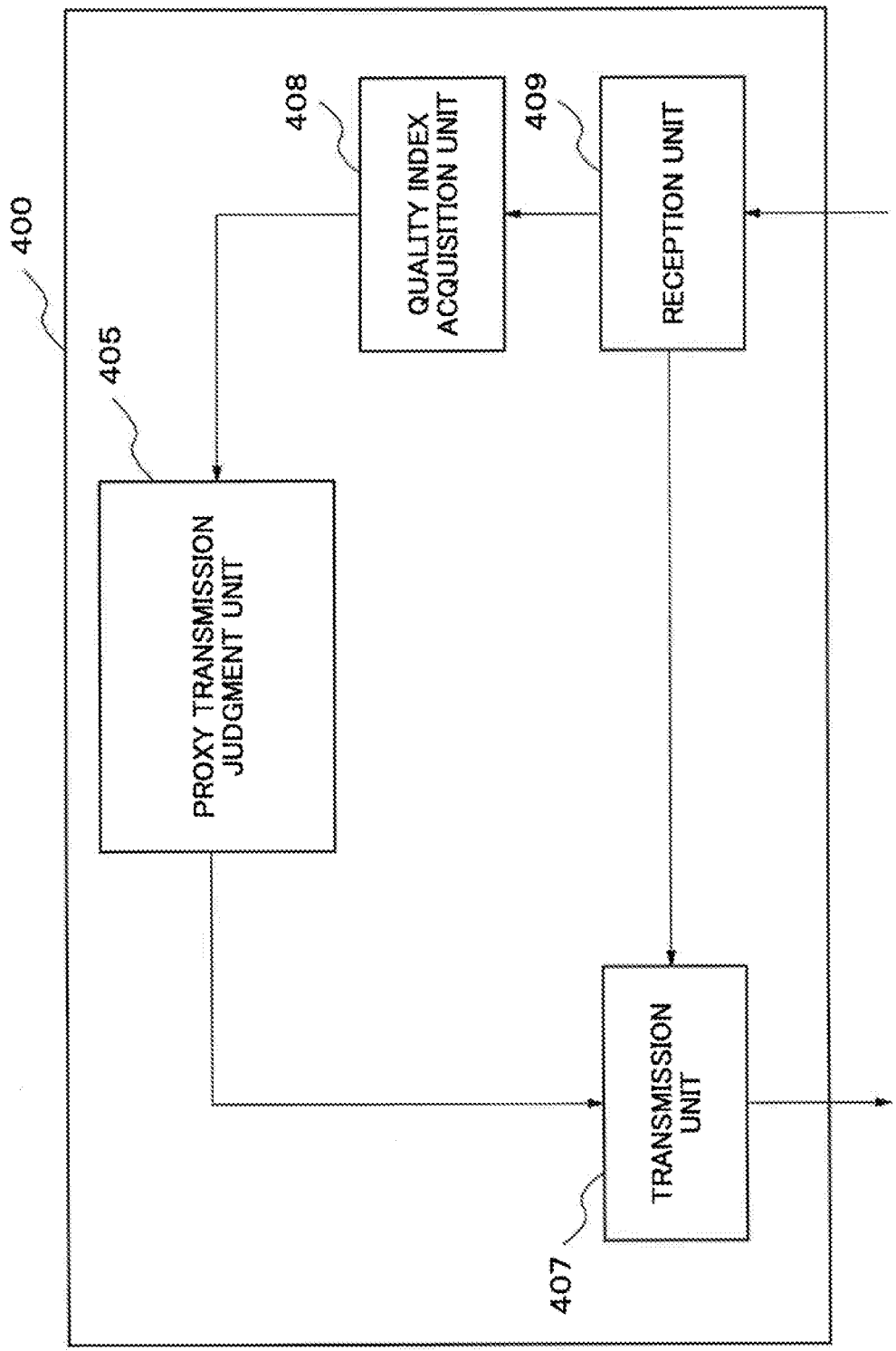
FIG. 13 is a figure showing a configuration of the communication device in the fourth exemplary embodiment.

Next, the fourth exemplary embodiment of the present invention will be described. FIG. 13 is the figure showing the configuration of the communication device of the fourth exemplary embodiment.

A communication device 400 in FIG. 13 includes a reception unit 409, a quality index acquisition unit 408, the proxy transmission judgment unit 405 and a transmission unit 407.

In FIG. 13, the reception unit 409 receives and accumulates the first datum which the first device not illustrated in the figure transmits addressing the second device and the second datum which the second device transmits. In addition, the quality index acquisition unit 408 acquires a first quality index concerning the quality of communication between the first device and the second device and a second quality index concerning the quality of communication between the communication device and the second device. Further, the proxy transmission judgment unit 405 judges whether transmitting the first datum which is received by the reception means to the second device or not, based on a comparison result of the first index and the second index and a reception condition of the second datum. The transmission unit 407 transmits the first datum to the second device.

The communication device 400 in FIG. 13 operates as follows. The reception unit 409 receives and accumulates the first datum which the first device not illustrated in the figure transmits addressing the second device and the second datum which the second device transmits. Then, the quality index acquisition unit 408 acquires a first quality index concerning the quality of communication between the first device and the second device and a second quality index concerning the quality of communication between the communication device and the second device. Further, the communication device 400 checks whether a reception condition of the second datum shows that the second device is correctly receiving the first datum. As the result of the checking, in the case of detecting that the second device is not correctly receiving the first datum, the communication device 400 compares the first quality index and the second quality index. When judging that the quality of communication between the communication device 400 and the second device is better than the quality of communication between the first device and the second device, the proxy transmission judgment unit 405 decides to transmit the first datum which is accumulated in the reception unit 409 to the second device. Then, the transmission unit 407 transmits the first datum to the second device based on the judgment of the proxy transmission judgment unit 405.

That is, the communication device according to the fourth exemplary embodiment executes the proxy transmission of the accumulated first datum to the second device, in the case that the second device is not correctly receiving the first datum and the quality of communication between the communication device and the second device is better than the quality of communication between the first device and the second device.

As described above, because the communication device executes the proxy transmission of the accumulated first datum to the second device considering the quality of communication of the first device, the second device and the communication device, the effect that suppressing degradation of a throughput of the communication system due to the proxy transmission is delivered.

While having described the invention of the present application referring to the exemplary embodiments, the invention of the present application is not limited to the above mentioned exemplary embodiments. It is to be understood that to the configurations and details of the invention of the present application, various changes can be made within the scope of the invention of the present application by those skilled in the arts.

This application is based upon and claims the benefit of priority from Japanese Patent Application No. 2009-073644, filed on 25 Mar. 2009, the contents of which is incorporated herein in its entirety by reference.

DESCRIPTION OF THE CODES 101 transmission source node
102 destination node
103-109 interception node
400 communication device
401 wireless LAN transmission and reception unit
402 proxy transmission packet storage unit
403 communication condition detection unit
404 communication condition storage unit
405 proxy transmission judgment unit
406 transmission parameter determination unit
407 transmission unit
408 quality index acquisition unit
409 reception unit
901 node position acquisition unit (the GPS communication function unit)
902 other node position information storage unit
903 node distance calculation unit
1201 node transmission packet storage unit
1202 node transmission packet QoS information detection unit
1203 proxy transmission packet QoS information detection unit

The invention claimed is:

1. A communication device comprising:
a reception unit which receives and accumulates a first datum which a first device transmits addressing a second device, and a second datum which the second device transmits;
a transmission unit which transmits said first datum to said second device; a quality index acquisition unit which acquires a first index which is a quality of communication between said first device and said second device, and a second index which is a quality of communication between said communication device and said second device; and
a judgment unit which makes said transmission unit transmit said accumulated first datum to said second device in the case of judging that said second index is better than said first index, and a reception condition of said second datum shows that said second device does not receive normally said first datum, wherein
said first index is a signal to noise ratio of said second datum at said first device;
said second index is a signal to noise ratio of said second datum at said communication device; and
said judgment unit judges that said second index is better than said first index in the case that said second index is larger than said first index.

2. The communication device according to claim 1, wherein
said communication device acquires said first index from said first datum; and
said communication device acquires said second index from said reception unit of said communication device.

3. The communication device according to claim 1, wherein:
said judgment unit judges that said second device does not receive normally said first datum in the case that said second datum is an acknowledgment which indicates success of a reception of said first datum in said second device and that said communication device does not receive said acknowledgment before a lapse of a predetermined time.

4. The communication device according to claim 1, wherein:
said judgment unit judges that said second device does not receive normally said first datum in the case that said second datum is a negative acknowledgement which indicates that said second device does not receive normally said first datum and that said communication device receives said negative acknowledgement.

5. The communication device according to claim 1, further comprising:
a unit which acquires a first required quality from received said first datum, wherein said judgment unit further judges whether said first datum should be transmitted to said second device or not based on a second required quality which is set to a third datum which said communication device transmits and said first required quality.

6. The communication device according to claim 5, wherein:
said first required quality and said second required quality are values which indicate priority of said first datum and priority of said third datum respectively; and
said communication device transmits said first datum to said second device in the case that priority of said first datum is higher than priority of said third datum.

7. The communication device according to claim 1, wherein
a backoff control is used in the case of transmitting to said second device of said first datum which is received by said reception unit.

8. A communication system, comprising a first device, a second device and a third device connected each other via a radio transmission channel; wherein
said third device is the communication device according to claim 1.

9. A communication device comprising:
a reception unit which receives and accumulates a first datum which a first device transmits addressing a second device, and a second datum which the second device transmits;
a transmission unit which transmits said first datum to said second device;
a quality index acquisition unit which acquires a first index which is a quality of communication between said first device and said second device, and a second index which is a quality of communication between said communication device and said second device; and
a judgment unit which makes said transmission unit transmit said accumulated first datum to said second device in the case of judging that said second index is better than said first index, and a reception condition of said second datum shows that said second device does not receive normally said first datum, wherein
said first index is a distance between said first device and said second device;
said second index is a distance between said communication device and the second device;
said judgment unit judges that said second index is better than said first index in the case that said second index is smaller than said first index; and
said communication device acquires said first index based on a position information on said first device recorded in said first datum and a position information on said second device recorded in said second datum and acquires said second index based on the position information on said second device recorded in said second datum and a position information on said communication device.

10. A non-transitory recording medium which stores a control program for a communication device, said program makes the communication device operate as:
a reception unit which receives and accumulates a first datum which a first device transmits addressing a second device and a second datum which the second device transmits;
a transmission unit which transmits said first datum to said second device;
a quality index acquisition unit which acquires a first index which is a quality of communication between said first device and said second device and a second index which is a quality of communication between said communication device and said second device; and
a judgment unit which forces to transmit said accumulated said first datum to said second device using said transmission unit in the case of judging that said second index is better than said first index and a reception condition of said second datum shows that said second device does not receive normally said first datum, wherein
said first index is a signal to noise ratio of said second datum at said first device;
said second index is a signal to noise ratio of said second datum at said communication device; and
said judgment unit judges that said second index is better than said first index in the case that said second index is larger than said first index.

11. A communication method, comprising:
receiving and accumulating a first datum which a first device transmits addressing a second device, and a second datum which the second device transmits;
acquiring a first index which is a quality of communication between said first device and said second device, and a second index which is a quality of communication between a communication device and said second device;
making transmit said accumulated first datum to said second device in the case of judging that said second index is better than said first index, and a reception condition of said second datum shows that said second device does not receive normally said first datum; and
transmitting said first datum to said second device, wherein
said first index is a signal to noise ratio of said second datum in said first device;
said second index is a signal to noise ratio of said second datum in said communication device; and
said making transmit said accumulated said first datum to said second device judges that said second index is better than said first index in the case that said second index is larger than said first index.

12. The communication method according to claim 11, said acquiring said first index and said second index further comprising:
acquiring said first index from said first datum; and
acquiring said second index from said receiving.

13. The communication method according to claim 11, wherein
said second datum is an acknowledgment which indicates success of a reception of said first datum in said second device; and
said making transmit said accumulated said first datum to said second device judges that said second device does not receive normally said first datum in the case that said communication device does not receive said acknowledgment before a lapse of a predetermined time.

14. The communication method according to claim 11, wherein
said second datum is a negative acknowledgement which shows that said second device does not receive normally said first datum; and
said communication method judges that said second device does not receive normally said first datum in the case that said communication device receives said negative acknowledgement.

15. The communication method according to claim 11, further comprising acquiring a first required quality from received said first datum, wherein
said making transmit said accumulated said first datum to said second device further judges whether said first datum should be transmitted to said second device or not based on a second required quality which is set to a third datum which said communication device transmits and said first required quality.

16. The communication method according to claim 15, characterized in that:
said first required quality and said second required quality are values which indicate priority of said first datum and priority of said third datum respectively; and
said communication method transmits said first datum to said second device in the case that priority of said first datum is higher than priority of said third datum.

17. The communication method according to claim 11, said transmitting said first datum to said second device comprising:
executing a backoff control in case of transmitting to said second device of said first datum received by the reception unit.

18. A communication method, comprising:
receiving and accumulating a first datum which a first device transmits addressing a second device, and a second datum which the second device transmits;
acquiring a first index which is a quality of communication between said first device and said second device, and a second index which is a quality of communication between a communication device and said second device;
making transmit said accumulated first datum to said second device in the case of judging that said second index is better than said first index, and a reception condition of said second datum shows that said second device does not receive normally said first datum; and
transmitting said first datum to said second device where in
said first index is a distance between said first device and said second device;
said second index is a distance between said communication device and the second device; and
said making transmit said accumulated said first datum to said second device judges that said second index is better than said first index in the case that said second index is smaller than said first index,
said acquiring said first index and said second index comprising:
acquiring said first index based on a position information on said first device recorded in said first datum and position information on said second device recorded in said second datum; and
acquiring said second index based on the position information on said second device recorded in said second datum and position information on said communication device.

19. A non-transitory recording medium which stores a control program for a communication device, said program makes the communication device operate as:
a reception unit which receives and accumulates a first datum which a first device transmits addressing a second device, and a second datum which the second device transmits;
a transmission unit which transmits said first datum to said second device;
a quality index acquisition unit which acquires a first index which is a quality of communication between said first device and said second device, and a second index which is a quality of communication between said communication device and said second device; and
a judgment unit which makes said transmission unit transmit said accumulated first datum to said second device in the case of judging that said second index is better than said first index, and a reception condition of said second datum shows that said second device does not receive normally said first datum, wherein
said first index is a distance between said first device and said second device;
said second index is a distance between said communication device and the second device;
said judgment unit judges that said second index is better than said first index in the case that said second index is smaller than said first index; and
said communication device acquires said first index base on a position information on said first device recorded in said first datum and a position information on said second device recorded in said second datum and acquires said second index based on the position information on said second device recorded in said second datum and a position information on said communication device.

* * * * *